Aug. 24, 1948.　　　　W. F. EAMES　　　　2,447,935
CONTROL SYSTEM
Filed May 10, 1946　　　　　　　　　　　　11 Sheets-Sheet 1
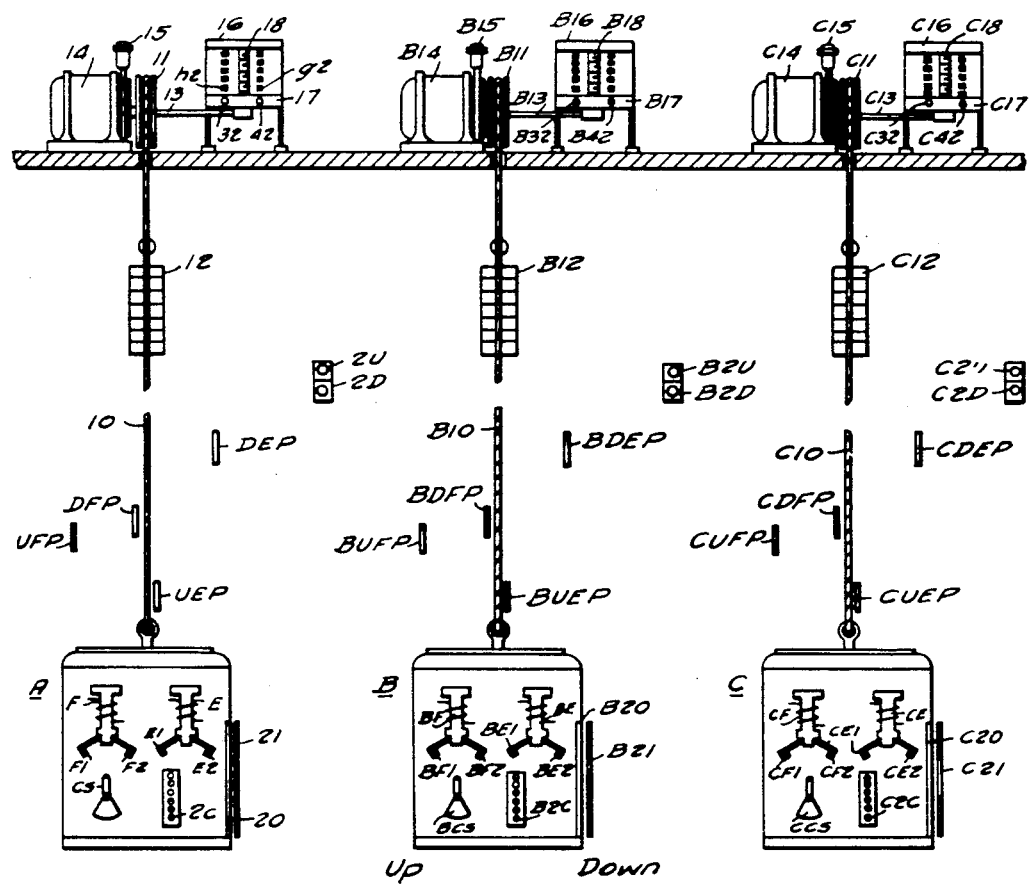
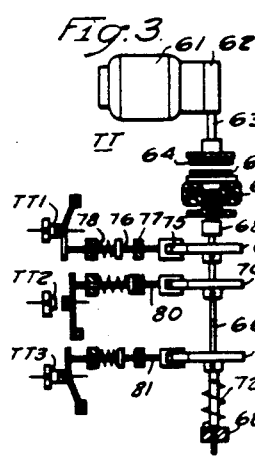
INVENTOR
William F. Eames.
BY
ATTORNEY Aug. 24, 1948.  W. F. EAMES  2,447,935
CONTROL SYSTEM
Filed May 10, 1946  11 Sheets-Sheet 7

Fig. 7A.

WITNESSES:

INVENTOR
William F. Eames.
BY
ATTORNEY

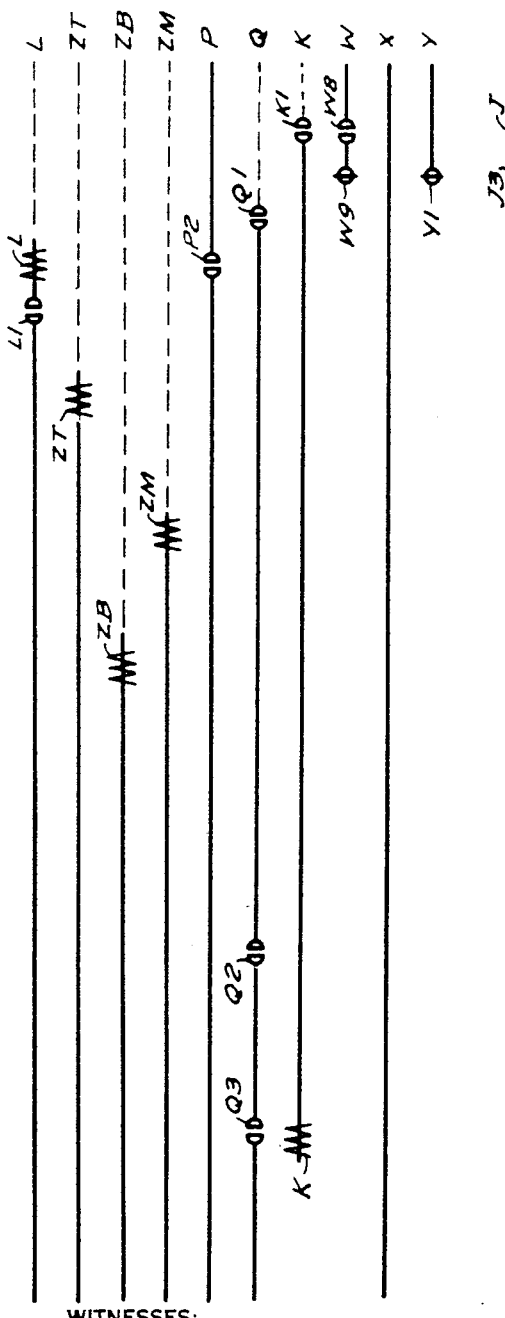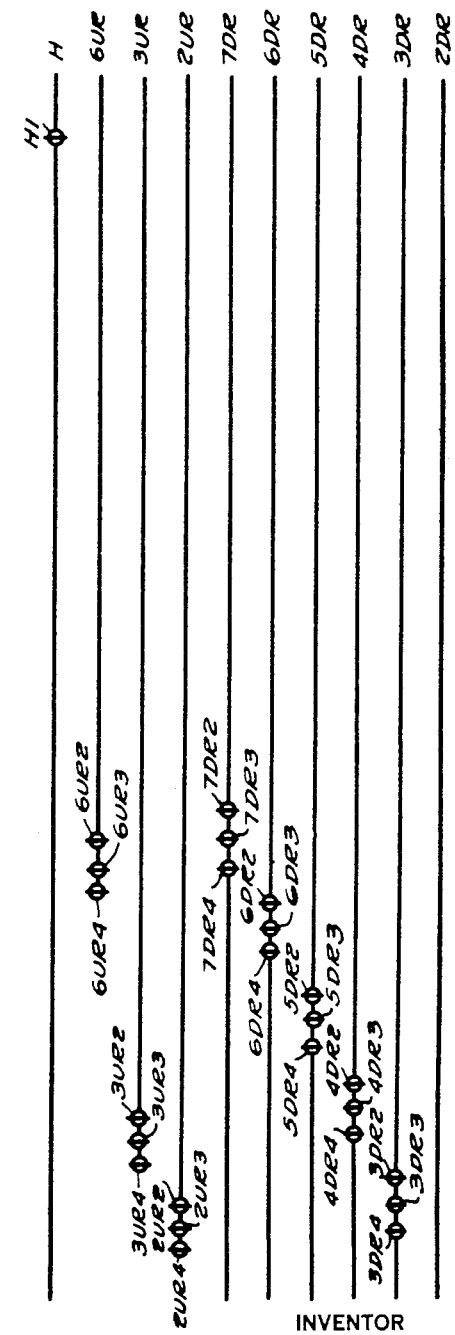
Fig. 8A.

Patented Aug. 24, 1948

2,447,935

UNITED STATES PATENT OFFICE 2,447,935

CONTROL SYSTEM

William F. Eames, Westfield, N. J., assignor to Westinghouse Electric Corporation, East Pittsburgh, Pa., a corporation of Pennsylvania Application May 10, 1946, Serial No. 668,661

20 Claims. (Cl. 187—29)

My invention relates to systems of control for electric elevators and, more particularly, to such systems as include a plurality of cars, operating together as a bank, and controlled by switches in the car and by passenger operated push buttons located at the various floor landings.

Although not limited thereto, my invention is particularly applicable to elevator systems in which the cars are driven at relatively high speeds and are automatically stopped at the floors by automatic landing equipment in response to operated push buttons in the cars and at the various floors. Such systems provide a particularly efficient passenger service for office buildings and tall structures having a large number of floors and a relatively large volume of passenger traffic.

However, there is a tendency for the cars in such elevator systems to become bunched in one part of the system and fail to promptly answer stop calls in the other parts of the system. For instance, at noon and in the evening when there is a rush by many of the tenants to leave the building, the down stop calls at the lower floors may remain unanswered for an undesirable length of time because the cars become so loaded at the upper floors that they can not stop to take on down passengers at the lower floors until the rush subsides.

Therefore, one object is to provide for improved operation of an elevator system when its facilities are being heavily taxed by a large number of stop calls registered by waiting passengers.

Another object is to provide every down passenger with an answer to his call within a reasonable length of time, particularly during rush periods.

Another object is to provide a timing system to be used in connection with the registration of floor calls which will permit car response to calls which have been registered for a long time, at the expense of refusing to make a stop for a call registered for only a short time.

A further object is to reverse an up-moving car to provide service at a floor where a down call of long standing exists.

A further object is to cause a down-moving car to automatically run past floors where calls are registered that would normally cause the car to stop, so that it may give service to a floor lower down where a down call of long standing is registered.

A still further object is to divide the floors served by an elevator into zones and to so control the cars that a special demand for service in one zone will cause a car in another zone to answer the call or calls in the zone in which the demand for extra service exists.

Another object is to provide means for dividing the floors served by an elevator into zones and for so controlling the cars that when a special down service demand occurs in any zone, it may pull excess capacity for service from either of two alternates; that is, it may call an up-moving car by reversing it, or it may call a down-moving car by causing it to by-pass registered calls at floors between it and the floor where the service demand begins.

Another object is to provide a system in which the demand for down service set up by operated down stop call buttons and the length of time they have been in an operated condition without being answered may be used to cause a car to answer such down call service whether such demand is created by a plurality of down stop calls of fairly long duration or a single down call of a longer predetermined duration.

In general, it is an object to borrow elevator capacity for service from one part of the system where it is not urgently needed and to supply it to another part of the system where it is urgently needed, the urgency being measured by the number of unanswered calls and the length of time they have remained unanswered.

Other objects of the invention will become evident from the following detailed description taken in conjunction with the accompanying drawings, in which:

Figure 1 illustrates an elevator system embodying my invention;

Fig. 2 illustrates the stationary contact segments and the moving brushes on a floor selector for one of the elevator cars embodied in Fig. 1, with the brushes disposed in the position they will be in when the car is stopped at the third floor;

Fig. 3 is a representation of a timing motor and mechanism for use in connection with the zone circuits.

Fig. 4 is a view in side elevation of the cams and contacts illustrated in Fig. 3.

Figure 5:
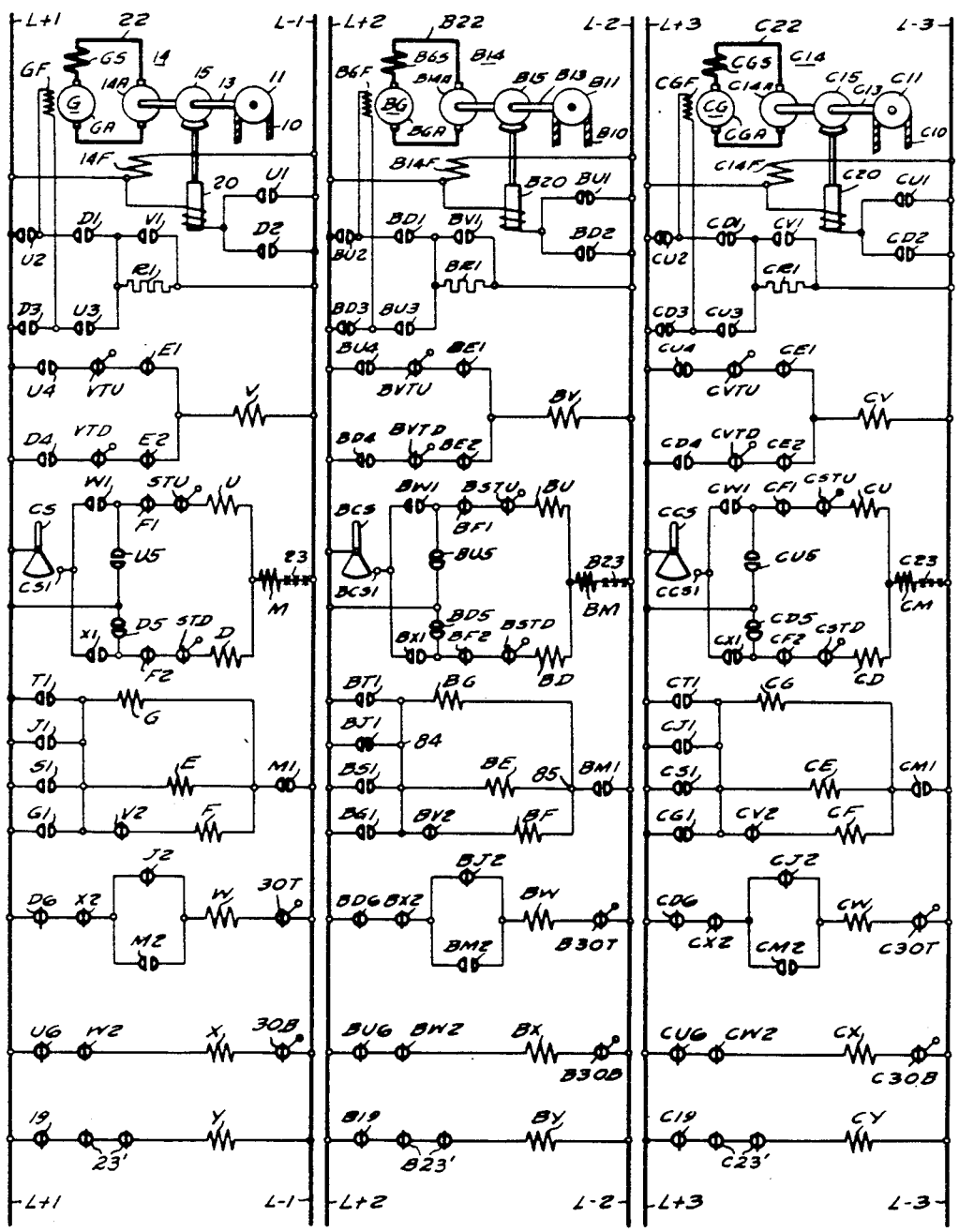
Figure 5A:
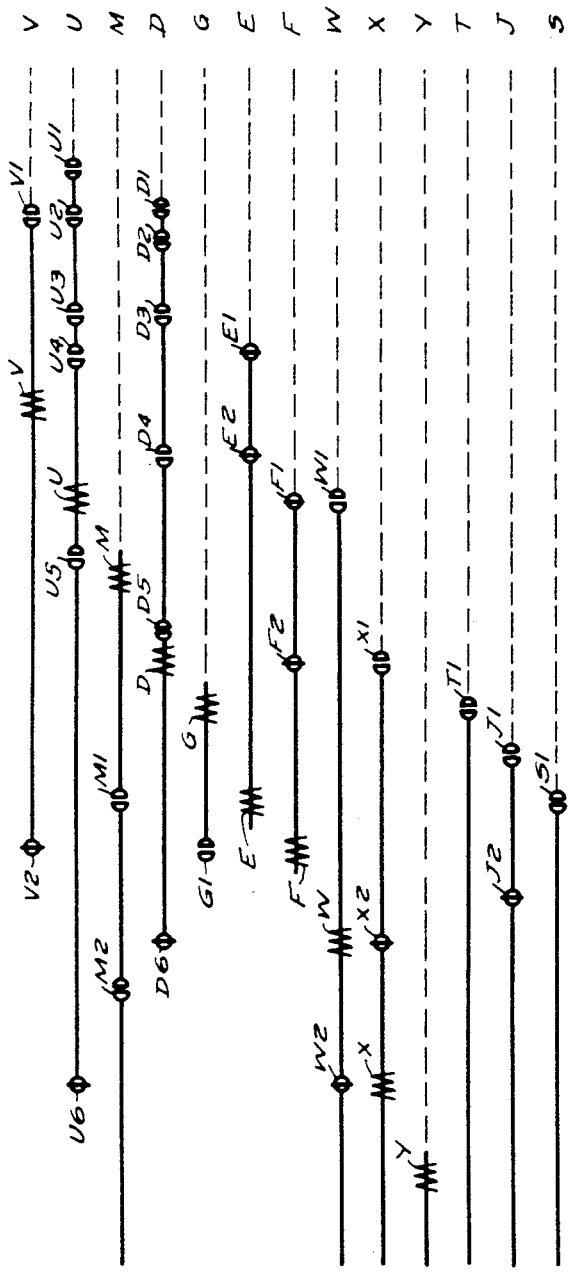

Figs. 5, 6, 7, 8 and 9 collectively constitute a diagrammatic representation in straight-line style of the circuit connections for the three-car elevator system illustrated in Fig. 1. These figures should be assembled vertically in numerical order with Fig. 3 at the top.

Figs. 5A to 9A, inclusive, are key representations of the relays in Figs. 3 to 6, inclusive, illustrating their coils and contact members disposed in horizontal alignment with their positions in the straight-line circuits of Figs. 5 to 9. Figs. 5A to 9A should be placed beside the corresponding Figs. 5 to 9 to facilitate the location of the various coils and contacts.

LIST OF RELAYS INCLUDED IN CONTROL CIRCUITS
Relays individual to car A

E—slow-down inductor relay
F—stopping inductor relay
G—inductor holding relay
H—No high car call relay
J—high call reversing relay
K—No hall call above relay
L—anti-by-pass relay
P—special service by-pass relays
Q—reverse service relay
S—floor call stopping relay
T—car call stopping relay
U—up direction switch
D—down direction switch
M—car running relay
V—high speed relay
W—up direction preference relay
X—down direction preference relay
Y—door relay
ZT—top zone relay
ZM—middle zone relay
ZB—bottom zone relay Relays common to all cars 7DR, 6DR, 5DR, 4DR, 3DR, 2DR } Down call-storing relays.

6UR, 3UR, 2UR } Up call-storing relays.

TT, TM, TB } Timers, one for each zone.

The relays, switches, etc., are given reference characters of letters with prefixes and suffixes to indicate various attributes. For example, in the character 2DR5, the number 2 means second floor, D means down direction, R means call registering relay, and 5 means the particular pair of contacts on that relay, so that the whole term indicates at a glance the contacts 5 of the down call registering relay for the second floor.

For the sake of simplicity, the apparatus individual to each car will be given the same reference characters except that the apparatus for cars B and C will be given the prefix B or C to indicate that it is for car B or car C instead of for car A.

Briefly, my system provides for dividing the floors served by a group of elevator cars into zones, measuring the demand for service in each zone and using that measurement when it becomes so excessive as to exceed a predetermined value, to cause some car in another zone which does not have much demand for service and which may therefore be called an idle car to move to and answer the calls in the zone having the excessive demand for service. It effects this either by stopping and reversing an idle up car or by causing an idle down car to by-pass a busy down car.

The demand for service in a zone may be measured by adding together the period of time each of the unanswered calls in a busy zone has remained unanswered. For instance, it may be assumed that an excessive demand for service exists in a zone when one call in that zone has remained unanswered for sixty seconds, or two calls have remained unanswered for thirty seconds, respectively, or three calls have remained unanswered for twenty seconds respectively, or one call has remained unanswered for twenty seconds while another call has remained unanswered for forty seconds, or any combination of unanswered calls in a busy zone causes its timing motor to complete its time-plus-calls measurement.

The system may be applied to any number of cars serving any number of floors, the zones may include any desired number of floors, and the length of delay may be of any desired value. For example, in a tall building having a very large number of floors served by four cars, each zone may include four floors and the unit of time delay to be taken into account in connection with a call may be ten seconds for each call.

In order to present the invention in simple form and to avoid the use of a large number of extended circuits, the present illustration and description of the invention will be made in connection with an elevator installation with a simple control system and having three cars A, B and C for serving seven floors, the upper six of which are divided into a low zone including the 2nd and 3rd floors, a middle zone including the 4th and 5th floors, and a top zone including the 6th and 7th floors and in which the time delay unit to be used will be twenty seconds and the excessive service demand necessary to cause an idle car to leave a low service demand zone and move to an excessive service demand zone will be sixty seconds; that is, when the times the various calls have remained unanswered add up to sixty seconds. It will also be obvious that, where the system is installed in very tall buildings, it will operate more effectively if each zone includes a larger number of floors, say four or five floors in each zone.

*Apparatus in Fig. 1 of the drawings*

As illustrated in Fig. 1, car A is supported in a hatchway by a cable 10 which passes over a sheave 11 to a counterweight 12. The sheave 11 is mounted for rotation by a shaft 13 driven by a motor 14. A brake 15 of the usual spring-operated, electromagnetically-released type is provided for stopping further rotation of the sheave 11 when the motor 14 is deenergized.

A floor selector 16, of any suitable type, is provided for connecting the various electrical circuits of the system in accordance with the position of car A. The shaft 13 is extended to operate a brush carriage 17 on the floor selector 16 by mechanically rotating a screw-threaded shaft 18 on which the carriage is mounted. The carriage 17 is provided with a number of brushes which are disposed, upon movement of the car, to successively engage stationary contacts arranged in rows on the selector in position to correspond to the floors of the building. For simplicity, only two brushes 32 and 42, and two rows of contact segments, b2 and g2, etc., disposed to be engaged by them are illustrated in Fig. 1, but it will be understood that in the system to be described herein, as well as in practice, a much larger number of brushes and rows of contact segments is required. Other forms of selectors may be substituted for the selector shown, if desired.

A starting switch CS is mounted in the car to be operated by the attendant to start the car.

When the car switch is rotated anticlockwise, it closes its contacts CS1 to start the car for the direction for which it is conditioned to operate. When the car switch is centered, it leaves the control system of the car in such condition that the car will stop automatically in response to the operation of hall buttons by waiting passengers at the floor landings and in response to the operation of the stop buttons in the car. It is to be understood that the car may be operated by the car switch or that any suitable control means either automatic or semiautomatic may be substituted for the car switch. The car switch is used for simplicity in describing the system.

The car buttons 2c, etc. (one for each floor) are mounted in the car, so that the attendant may, by operating them, cause the car to stop automatically at any floor. The direction of operation of the car is controlled by relays W and X as will be described in connection with Fig. 5.

The hall buttons are mounted at the floor landings, in order that waiting passengers may cause the cars to stop thereat. An up button and a down button are provided at each floor intermediate the terminals. A down button is disposed at the top terminal. Fig. 1 illustrates only the up hall call button 2U and the down hall call 2D for the 2nd floor.

In order to automatically effect accurate stopping of car A at the floors in response to operation of the stopping buttons 2c, etc., in the car, or by operation of the hall call buttons 2U, 2D, etc., at the floors, a slowdown inductor relay E and a stopping inductor relay F are mounted on the car in position to cooperate with suitable inductor plates of iron or other magnetic material, mounted in the hatchway adjacent to each floor. Only the up plates UEP and UFP and the down plates DEP and DFP for the second floor are illustrated. Similar plates are provided for each floor, except that the top terminal has only up plates and the bottom terminal only down plates.

The inductor relays E and F, when their coils are energized, have normally incomplete magnetic circuits which are successively completed by the inductor plates as the car approaches a floor at which a stop is to be made. These relays are so designed that energization of the operating coil of a relay will not produce operation of its contacts until the relay is brought opposite its inductor plate, thereby completing the relay magnetic circuit. Upon operation of the relay contacts (such as E1 or E2) they remain in operated condition until the relay operating coil is deenergized, even though the inductor relay moves away from the position opposite the inductor plate which completed its magnetic circuit. The plates should be so spaced in the hatchway as to provide desirable distances for slowdown and stopping of the cars at the floors. Other methods of controlling slowing down and stopping of the car may be used if so desired.

The car A is provided with a car gate or door 20 disposed for alinement with a corridor door 21 at each hall entrance. Similar gates and doors are provided for cars B and C.

*Apparatus in Fig. 2*

Fig. 2 is an enlarged view of the floor selector 16 of Fig. 1. In this figure, the various stationary conducting segments are represented by rectangles and the contacting brushes by small circles. The brush carriage 17 is shown by dotted lines in the position it occupies when the associated car is stopped at the 3rd floor.

The contact segments a2 to a7 on the floor selector are disposed to be successively engaged by a brush 30 to control the high car call relay H and by a brush 31 for completing stop circuits set up by the call push buttons in the car for up direction stops. The brush 30 should be long enough to bridge adjacent contact segments.

The contact segments b2 to b6 and the brush 32 are for connecting the circuits (see Fig. 7) of the stop buttons 2U, etc., at the floor landings for up stops. The up contact segments c2 to c7 and the brush 33 are provided for connecting circuits (see Fig. 7) for cancelling stop calls registered by the up hall call buttons 2U, etc. The up contact segments d2 to d7 and the brush 34 connect circuits (see Fig. 8) for the high call relay K to be described later. The contact segments e2 to e7 and the brush 40 connect circuits for the zone relays illustrated in Fig. 8.

The down cancel contact segments f2, etc., and brush 41, the down floor call contact segments g2, etc., and brush 42, and the down car call contact segments h2, etc., and brush 43 are provided for connecting circuits for the down direction in the same manner as described for the up direction.

On the right-hand side of the floor selector, a series of switches 52 to 56 are illustrated as disposed to be operated by a cam 49 on the carriage 17 as it moves from its floor to floor position, for the purpose of controlling the high car call circuit.

*Apparatus in Figs. 3 and 4*

Figure 9:
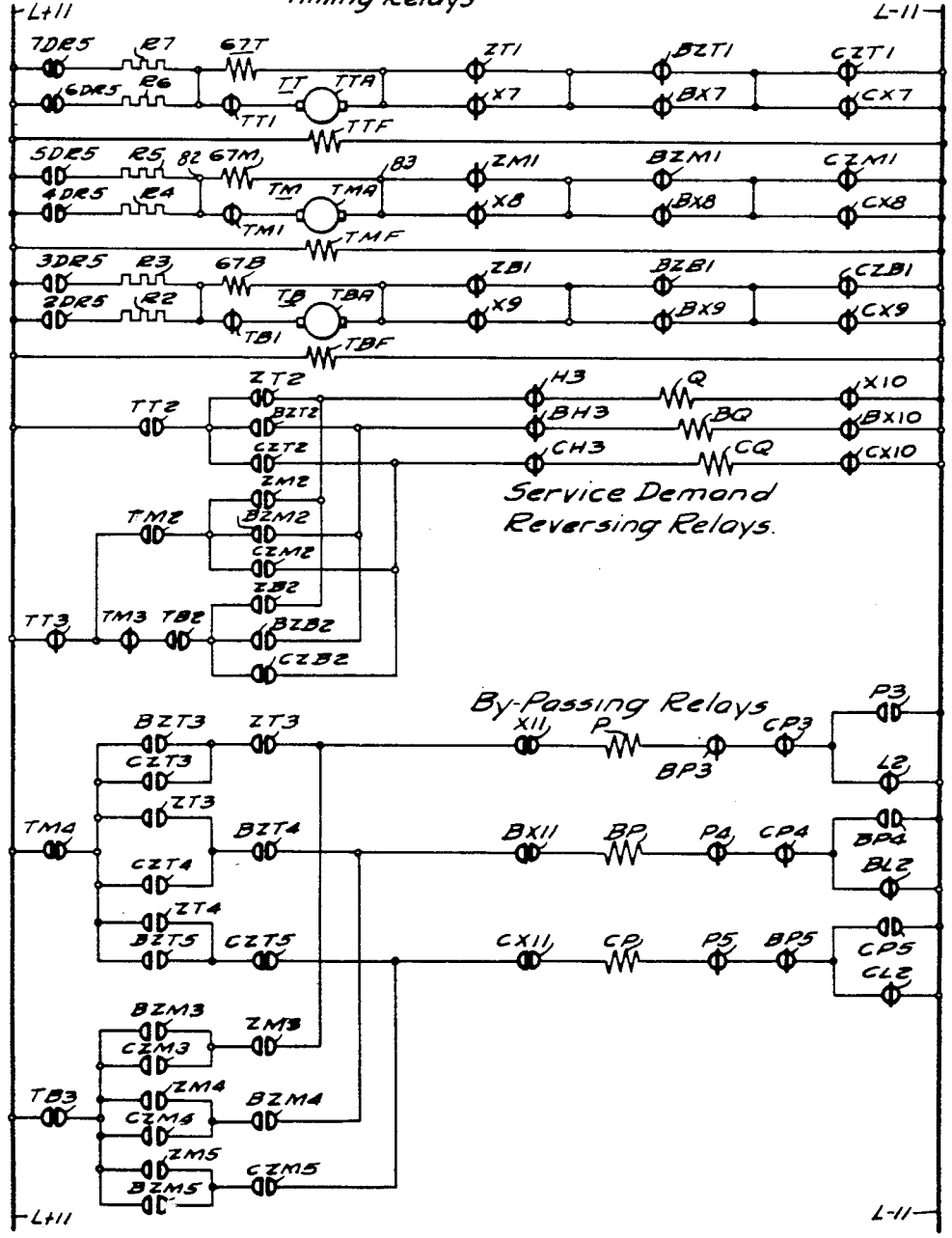
Figure 9A:
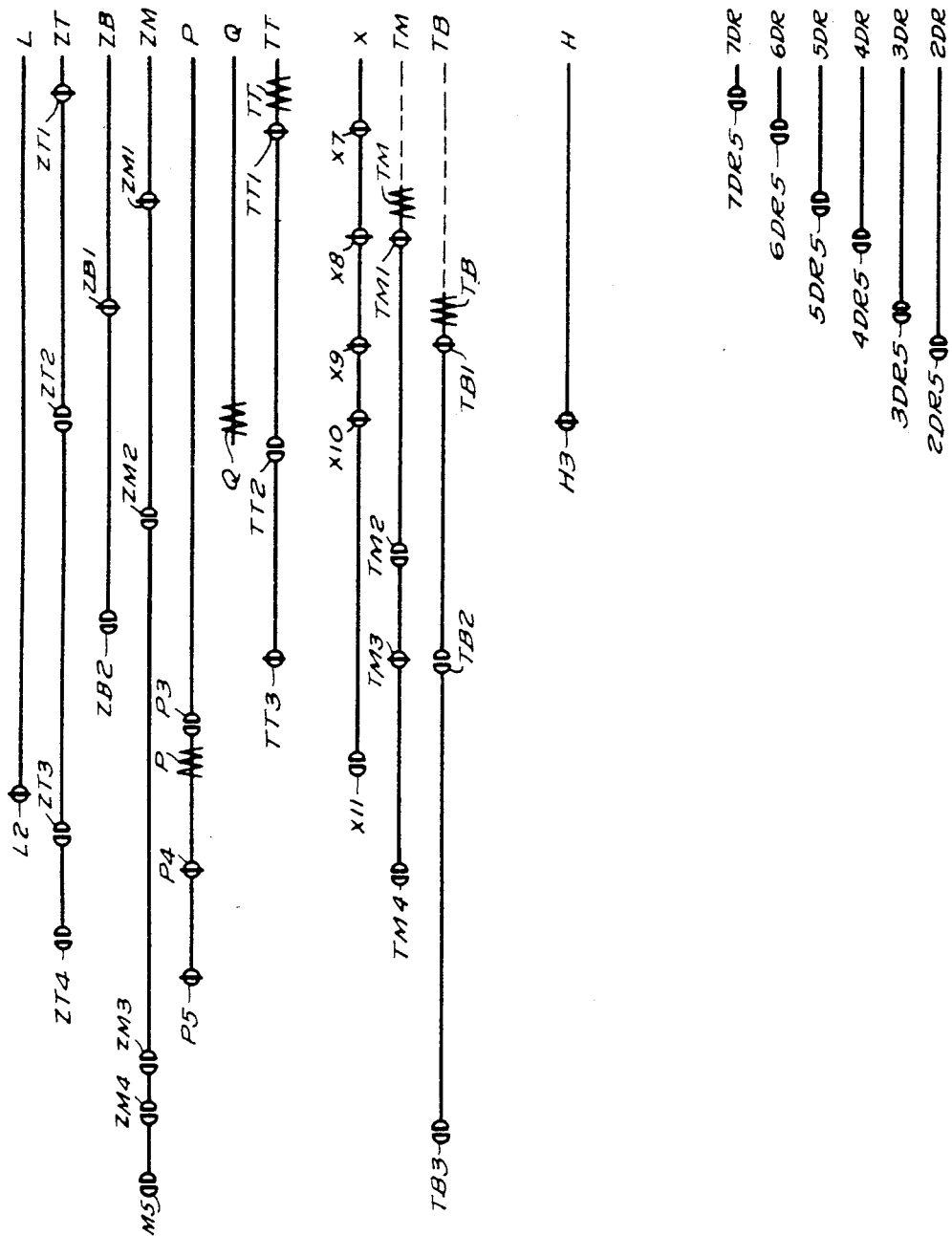

Figs. 3 and 4 illustrate the mechanical features of one of the timing relays, such as TT, the circuits for which are included in Fig. 9. These relays are common to all the cars and there is one for each zone for the purpose of determining or measuring the service demand in that zone; that is, the total time the unanswered calls registered in that zone remain unanswered.

As illustrated in Figs. 3 and 4, the relay TT comprises a direct-current motor 61 connected by a gear reducing unit 62 to operate a shaft 63 upon the outer end of which is disposed a clutch facing 64. A clutch facing 65 is slidably disposed on the splined end of a shaft 66 in position to be moved axially into engagement with the clutch facing 64 by an electromagnet 67T. The shaft 66 may be supported by a plurality of bearings 68 and has mounted upon it three cam wheels 69, 70 and 71.

A spiral spring 72 is coiled around the shaft 66 with one end affixed to the shaft and the other end affixed to the lower bearing 68 to return the shaft and its cams to normal position after they are operated. When the motor is energized and the clutch is engaged, the motor rotates the shaft 66 and its cam wheels against the spring. When the clutch is released, the spring returns the shaft and the cam wheels to their original starting position to make a new start when the clutch and motor are again energized.

The cam wheel 69 is disposed to engage a roller 75 axially operating a shaft 76 slidably mounted in a pair of bearings 77 to open a pair of contact members TT1 as the shaft 66 nears the end of one revolution. A coil spring 78 is disposed on the shaft to bias the roller 75 against the outer periphery of the cam 69. The cam 70 operates a shaft 80 in a similar manner for closing a pair of contact members TT2, as it nears the end of one revolution. The cam wheel 71 operates a shaft 81 for opening a pair of contact members TT3 as it nears the end of one revolution and thereby stop the motor. When the calls which operated the relay are answered, the spring 72 returns the contacts to the normal condition in which TT1 closes to prepare the motor for its next operation.

The timing relay TM is constructed in the same manner as the relay TT but is provided with two pairs of contacts TM2 and TM4 which close and two pairs of contacts TM1 and TM3 which open as its shaft nears the end of one revolution. The timing relay TB is provided with contacts similar to the contacts on the relay TT.

Apparatus in Fig. 5

Referring particularly to Fig. 5, the control circuits on the left-hand side are individual to car A, the circuits in the center are individual to car B and the circuits on the right-hand side are individual to car C.

The motor 14 is provided with an armature 14A mechanically connected to the shaft 13 for driving the sheave 11. The brake 15 is provided with a winding 24 which is energized to release the brake when the motor 14 is energized. The motor includes the usual shunt-type main field winding 14F connected for energization across the supply conductors L+1 and L—1. The armature 14A is connected for energization by a loop circuit 22 to a generator G provided with an armature GA.

In order to control the direction and magnitude of the voltage generated by the generator armature GA, a separately-excited main field winding GF is provided for the generator G. A field resistor R1 is included in the circuit of the field winding GF to provide speed control for the motor 14. The generator G is provided with suitable means such as a series field winding GS for correcting the speed regulation of motor 14.

The master switch CS located in car A for starting the car is electrically connected to selectively control the energization of the operating windings of an up direction switch U and a down direction switch D and a car running relay M. The switches U and D are provided with contact members for connecting the generator field winding GF to the supply conductors L+1 and L—1 in accordance with the direction for which the car is conditioned to run by the up direction preference relay W or the down direction preference relay X. The car running relay M is energized to condition certain circuits for operation while the car is running. The common circuit of the reversing switches U and D and the running relay M includes the usual safety devices indicated at 23.

The up direction preference relay W and the down direction preference relay X are provided for controlling the direction of operation of the car and performing certain functions in connection therewith. The operating windings of these relays are controlled by a top limit switch 30T, a bottom limit switch 30B, the direction switches U and D and the high-call reversal relay J. Each of the limit switches 30T and 30B is arranged to be opened when car A arrives at the corresponding terminal, thereby interrupting the circuit of the direction preference relay W or X corresponding to the direction of operation of the car and thereby automatically reversing it at the terminals. Also when the high call reversal relay J is operated while the car is between terminals, the relays W and X are operated to reverse the direction switches. Hence all the car attendant has to do in operating the car is to close the car switch CS temporarily to start the car and operate the car call buttons for stops for the passengers in the car.

A high-speed relay V is provided for short-circuiting the resistor R1 disposed in series circuit relation with the generator field winding GF for applying the maximum voltage to that winding to cause the car to operate at normal high speed. This relay is controlled by the switches U or D on starting and by the slowdown inductor relay E when stopping.

An upper and a lower mechanical limit switch VTU and VTD, are provided for interrupting the circuit of the high-speed relay V when the car reaches a proper slow-down point in advance of the upper and lower terminals, respectively, and an upper and a lower stopping limit switch STU and STD, are provided for opening the circuits of the reversing switches U and D at the terminal limits, in accordance with the usual practice, so that the car will be automatically decelerated and stopped at the terminals regardless of calls thereat.

Figure 7:
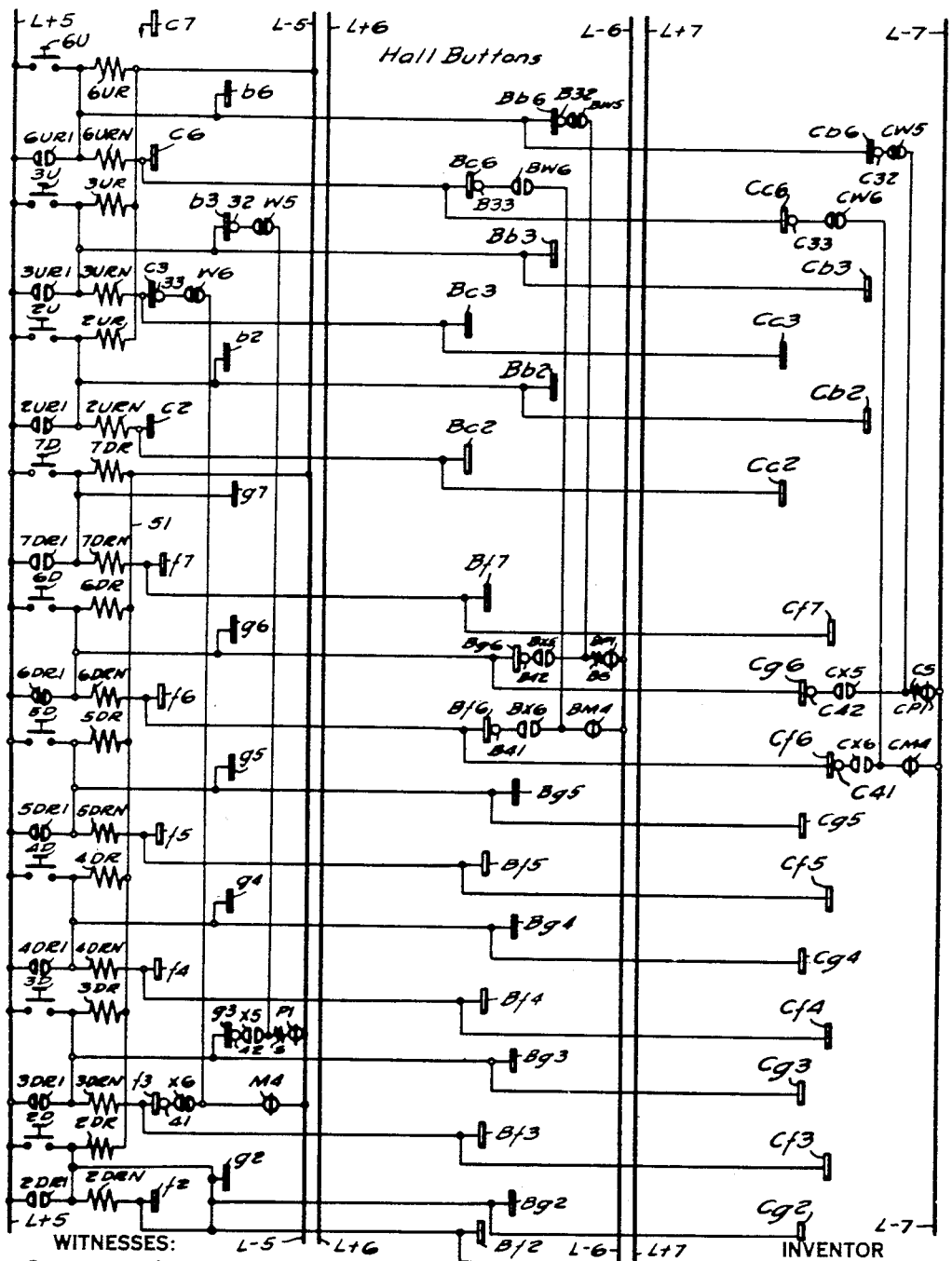
Figure 8:
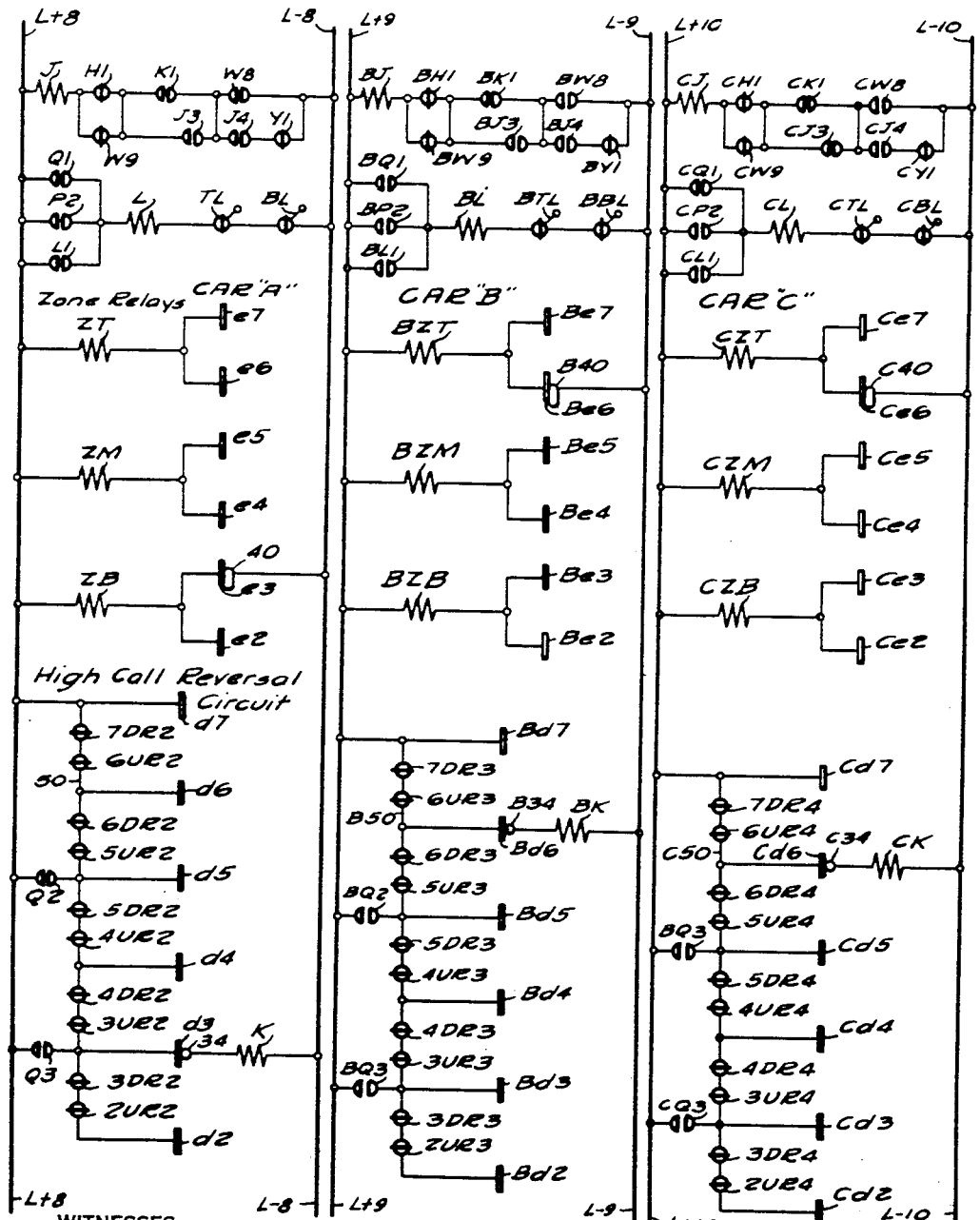

The energizing coils for the slowdown inductor relay E and the stopping inductor relay F, are illustrated in Fig. 5 as arranged to be energized by operation of the contacts S1 of a hall call stopping relay S or by the contacts T1 of the car button relay T or by the contacts J1 of the high call reversing relay J. (The operating coils for relays S and T are illustrated in Fig. 7 and the coil for relay J is illustrated in Fig. 8 and will be described in connection therewith.)

An inductor holding relay G is provided for maintaining the inductor relays in energized condition during decelerating and stopping-operations.

A door relay Y is illustrated as controlled by a pair of safety contacts 19 controlled by the car gate 20 and a plurality of door safety contacts 23' controlled by the hatchway doors 21. The relay Y may be used for various safety circuits and for assisting in the control of the high call reversing relay J shown in Fig. 8.

Figure 6:
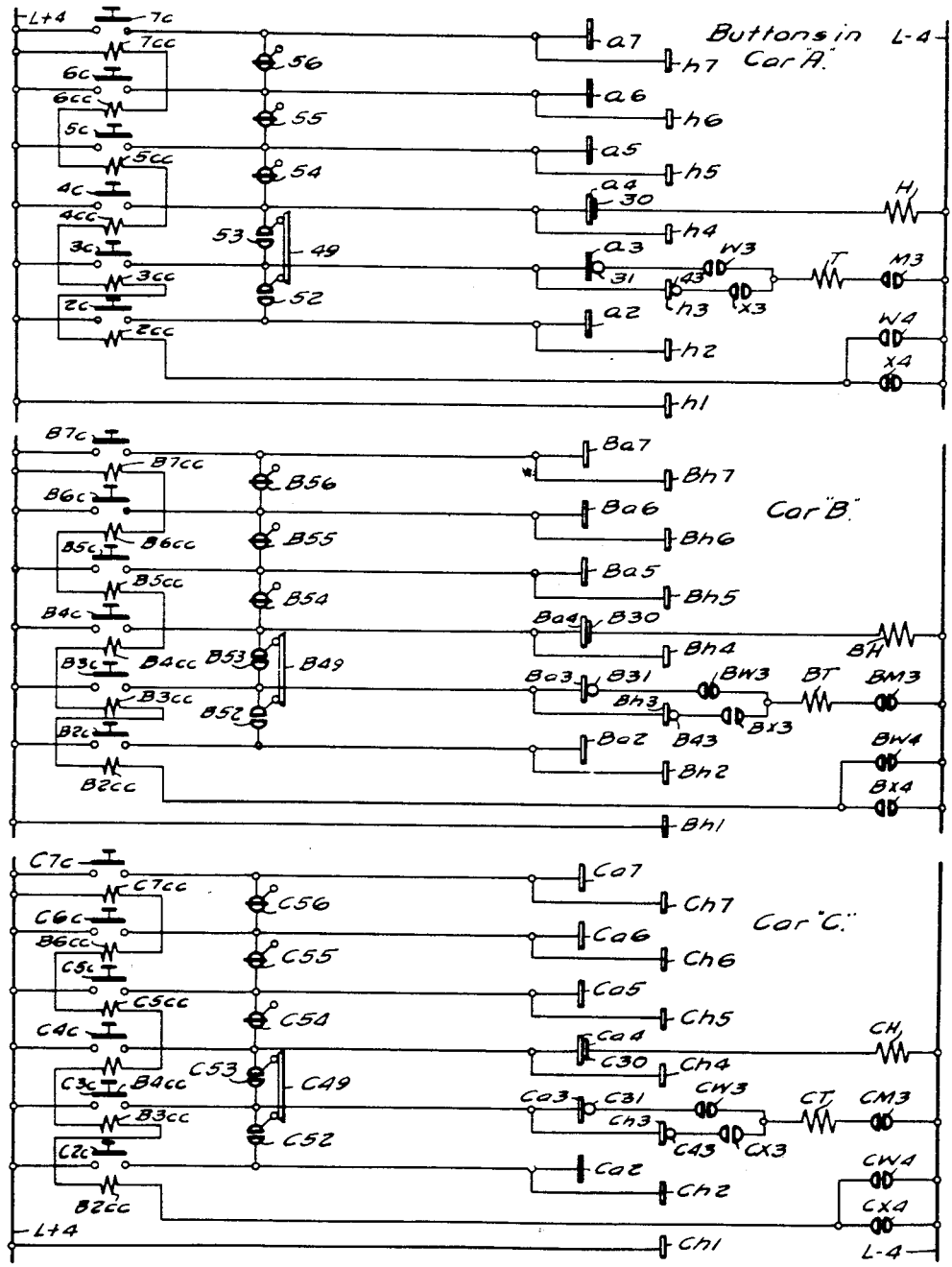
Figure 6A:
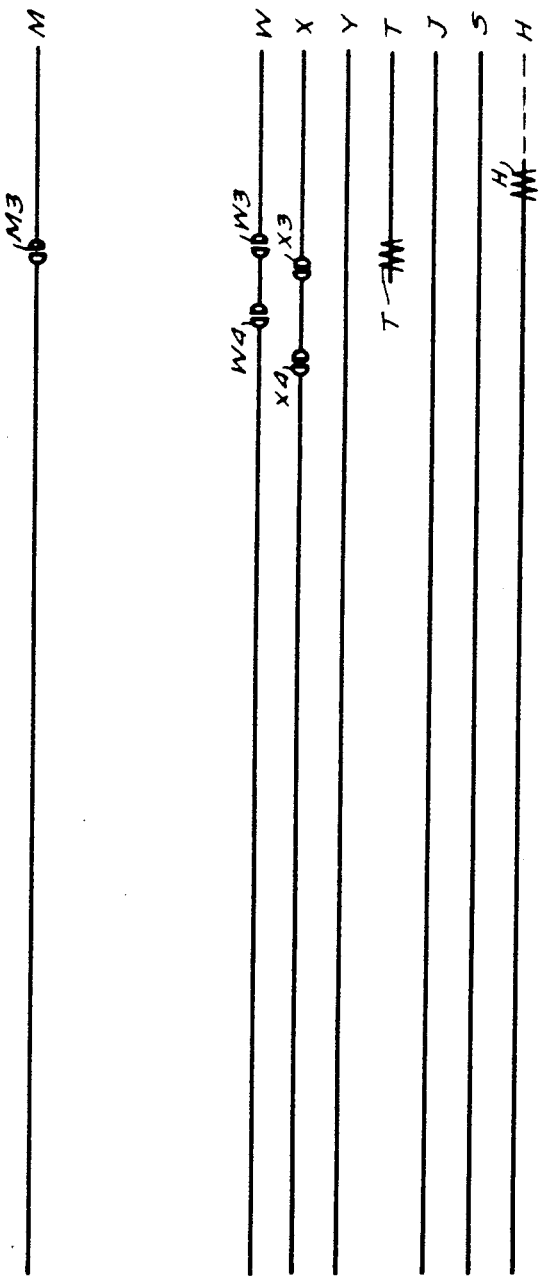

Apparatus in Fig. 6

The car buttons 2c, etc., described in connection with Fig. 1, are illustrated with their holding coils 2cc, etc., and circuits in the upper part of Fig. 6, in connection with the high car call relay H and the car call stopping relay T. The coils 2cc, etc., are energized when the car starts in either direction to hold in the car buttons 2c, 3c, etc., as they are operated, until the direction of the car is reversed by operation of the direction preference relays, so that the temporary operation of a car button by the attendant will cause it to remain in operated condition until the car is reversed.

The high car call relay H is used to prevent relay J (Fig. 8) from reversing the car at the highest registered floor call while a stop call for a floor above remains registered on the stop buttons in the car. It is connected by the advance brush 30 to the row of contact segments a2, etc., on the floor selector 16, so that it will be energized whenever a stop call is registered on one of the stop buttons in car A from a floor above the car. The switches 52 to 56, inclusive, operated by the cam 49, are disposed in the circuits of the car buttons to prevent energization of the relays H and T by operated stop buttons in car A for floors at and below that car.

The car stopping relay T is connected to the up brush 31 engaging the row of contact segments $a2$, etc., and to the down brush 43 engaging the row of stopping contact segments $h2$, etc.; so that, when a call is registered on a car button and the car approaches the floor corresponding to the energized contact segment, relay T will be energized to stop the car by energizing the decelerating and stopping inductor relays E and F.

*Apparatus in Fig. 7*

The floor buttons 2U, 2D, etc., described in connection with Fig. 1 are shown with their circuits in Fig. 7. Associated with each floor button is a call registering or storing relay by means of which the momentary pressing of the button will set up or register a stop call which will hold itself until it is answered by the stopping of a car at that floor for the direction of the registered call. The call registering relays are common to all the cars and are designated as 2DR to 7DR for the down direction and as 2UR, 3UR and 6UR for the up direction. For simplicity, the up direction registering relays and floor buttons for only the 2nd, 3rd and 6th floors are shown, as the up buttons and registering relays for the other floors will be readily understood.

The down call registering relays, when energized, close circuits to the row of down car stopping contact segments $g2$, etc., and the down call cancelling contacts $f2$, etc., while the up registering relays, when energized, close circuits to the row of up car stopping contact segments $b2$, etc., and the up call cancelling contacts $c2$, etc., on the floor selector so that the contact segment for a floor for which a call is registered remains energized until the call is answered.

The car stopping relay S is shown as connected to the up brush 32 engaging segments $b2$, etc., and the down brush 42 engaging segment $g2$, etc. When the car approaches a floor in a direction for which a call is registered, the corresponding brush engages the energized contact segment for that floor and that direction and thereby causes the relay S to be energized, which, in turn, energizes the inductor relays E and F of that car to slow it down and stop it at that floor.

A cancellation coil is wound in opposition to each call registering coil and connected to the cancellation contact segments on the floor selector. The up cancellation coils are designated as 2URN, etc., connected to the up segments $c2$, etc., and the down cancellation coils as 2DRN, etc., connected to the down segments $f2$, etc. As the brush 33 moves over the segments $c2$, etc., and the brush 41 moves over the segments $f2$, etc., they cooperate with the direction relays W and X to energize the cancellation coil for any floor at which the car stops to answer a stop call.

*Apparatus in Fig. 8*

The hall-call-above relay K or car A and its circuits are shown in the lower part of the Fig. 8; the high call reversal relay J of car A and its circuits are shown at the top of the sheet; the anti-by-pass relay L of car A and its circuits are shown near the top of the sheet; and the zone relays ZT, ZM, etc., and their circuits are shown in the central part of the sheet. Similar relays for cars B and C are also shown in Fig. 8.

The high floor call relay K of car A operates in conjunction with the high car call relay H to control the operation of the high call reversing relay J in accordance with the existence or non-existence of registered calls for floors above the car. The relay K is connected to the supply conductor L+8, through a call indicator circuit 50 which includes back contacts of the up and the down call registering relays arranged in series relation according to the natural sequence of the floors. The points in the circuit which correspond to the floors are connected to the contact segments $d2$, etc. Consequently, when car A is making a trip, its relay K will not be energized as long as a hall call exists for any floor above the floor of the contact segment on which the brush 34 rests, but as soon as the brush reaches a segment with no stored calls above it, a circuit for the relay is completed and it is energized.

The high call reversing relay J is controlled by the back contacts H1 of the high car call relay H and the front contacts K1 of the high floor call relay K and is provided for so preparing the circuits of car A that it will stop and reverse its direction of operation at the floor of the highest registered down call in the high zone when there is no car call or hall call above it. When the relay J is energized, it causes the car to stop by closing its contacts J1 in the circuit of the inductor relays E and F (Fig. 5) and it then reverses the direction for the stopped car by opening its contacts J2 in the circuit of the up direction preference relay W (Fig. 5).

The zone relays such as ZT are provided for dividing the floors served by the cars into zones for each car and for determining which zone the cars are in. The zone relays for car A are ZT for the top zone comprising the 6th and 7th floors; ZM for the middle zone comprising the 4th and 5th floors; and ZB for the bottom zone comprising the 2nd and 3rd floors. The zone relays for car A are electrically connected to the floor selector contacts $e2$, etc., under the brush 40 so that the presence of the car in a zone will energize its zone relay for that zone. Each of the cars B and C is provided with similar zone relays.

The anti-by-pass relay L is provided for preventing more than one by-passing operation of car A on a down trip and also to prevent a by-passing operation of car A after it has a high call reversal. Similar anti-by-pass relays BL and CL are provided for the cars B and C.

*Apparatus in Fig. 9*

Fig. 9 illustrates the circuits for the timers or timing relays TT, TM and TB; the special service reversing relays Q, BQ, and CQ; and the by-passing relays P, BP and CP.

The timers TT, TM and TB are used for measuring the accumulated service demand in any one of the zones and then effecting such operation of the sysem as will either reverse a car or cause a car to by-pass new calls in order to give better service to the zone in which exists the accumulated service demand caused by long unanswered calls therein.

The timer TT is provided with a field winding TTF and an armature TTA. The field winding is connected across the supply conductors L+11 and L−11 for constant energization. The armature is arranged for connection to the supply conductors L+11 and L−11 by means of contacts 6DR5 and 7DR5 so that the motor will be started when one or more down calls are registered in the top zone and will then measure the time such call or calls remain unanswered. The measure of the time is effected by placing measuring resistors in the circuits leading to the armature. The measuring resistor R7 is disposed in series with the contacts 7DR5 of the call registering relay 7DR and the measuring resistor R6 is disposed in series with the contacts 6DR5 and in parallel with the resistor R7.

When a down call is registered at the 7th floor, current flows to the armature through the resistor R7 and causes the motor to rotate at such a rate that it closes its contacts TT2 and opens its contacts TT3 at the end of sixty seconds. If calls are registered at both the 6th floor and the 7th floor, current will flow through both resistors to such extent that the motor will rotate twice as fast and operate the contacts at the end of thirty seconds. Variations in times of call registrations at the 6th and 7th floors will vary the time delay in the operation of the contacts. A limit switch to stop the motor at the end of its measuring operation is provided by its self-operated contacts TT1.

Assuming a value of 40 ohms for each resistor, 8 ohms for the clutch, and 20 ohms for the armature and a supply voltage of 100 volts, the motor will measure the demand for service in the top zone approximately as indicated. However, it will be apparent that with more floors included in the zone and, consequently, more resistors disposed in parallel in the motor circuit, the motor will give varying measures indicating the service demand for that zone in accordance with the number of floor calls registered and the length of time each has remained unanswered.

The circuit for the timing motor TT also includes back contacts of the down direction relays X, BX and CX and the zoning relays ZT, BZT and CZT in parallel to reset the motor when a car arrives in the top zone on its down travel. The timing motors TM and TB have similar contacts in their circuits for a like purpose.

Although the present summation of service demand which should call a car to the zone in which such demand exists has been arbitrarily set as a period of sixty seconds for one call or 30 seconds for two simultaneous calls as an example, the resistors and apparatus may be selected with such values as will cause the timing motors to operate their contacts when the service demand summation reaches any other selected value.

The reverse service or special service reversing relay Q for car A, and similar relays BQ and CQ for the cars B and C, are provided to respond to the existence of a service demand as indicated by the timing relays TT, TM and TB under certain conditions so as to cause an up-moving car with no car calls above it to stop and reverse for answering down calls in the zone in which the service demand exists and then move on down to the ground floor. The reverse service relay for a car can be energized only when that car is on an up trip.

The circuit for the reverse service relay Q includes front contacts of the no car call above relay H so that car A can be reversed for a service demand only when it has no car calls ahead of it on its up trip. The circuits for the reverse service relays for the other cars include similar contacts for similar purposes.

The special service by-pass relays, P for car A and BP and CP for the cars B and C, are provided for responding to the operation of the timing relays TT, TM and TB for causing a down car under certain conditions to by-pass new calls in front of it and to go to and answer the calls in a zone in which a service demand exists. For example, when two cars are in the top zone on down trips and down service demand calls exist in the middle zone, then one of the cars, will by-pass the down calls in the top zone and travel to and answer the down calls in the middle zone, when no up car is in position or condition to stop and reverse to answer that service demand.

The circuit of the by-passing relay P includes front contacts BZT3 and CZT3 in parallel and in series with contacts ZT3 so that it will require two cars, either A and B or A and C, in the top zone before car A can by-pass down calls in the top zone. The circuits for the relays BP and CP are provided with similar contacts for similar reasons.

The circuit of the relay P also includes in series the back contacts BP3 and CP3 to prevent the operation of the relay P to by-pass car A if any other car is in the act of by-passing. The circuits of the relays BP and CP are provided with similar contacts. Hence, only one car in the system can by-pass at a time. Inasmuch as it requires only a few seconds for a car to run out of a zone when by-passed, several calls can be by-passed in succession in ten seconds time. These contacts prevent the simultaneous by-passing of cars and thereby achieve a desirable result.

The circuit of the relay P for car A also includes the contacts P3 and L2 in parallel so that the by-passing means of car A will be locked out after one operation, as explained in connection with the description of the relay L, thus preventing repeated by-passing of car A. Each of the relays BP and CP is provided with similar parallel contacts to prevent the repeated by-passing of cars B and C.

The circuit for the relay P of car A also includes the contacts X11 of the down direction relay X so as to prevent operation of the relay P when car A is on an up trip and when stopped at a floor on a down trip. The circuits of the relay BP and CP include similar contacts for similar reasons, so that the by-passing relay for a car can be energized only when that car is on a down trip.

If an "idle" up car is in position and condition to be operated by its reverse service relay and a down car is in position and condition to be operated by its by-pass relay, the car which will be operated to answer the special demand will be the car whose relay picks up first and the relay which picks up first will lock out the other relays so that only one car will answer the service demand.

Although the system has been described as an example of how the invention may be adapted to care for down service demands where it will be most desirable, it will be apparent that the invention may be used for taking care of either up or down service demands for all floors or for any desired floor.

The invention may be better understood by an assumed operation of the apparatus and circuits.

*Up car reverses at highest down call in middle zone in response to service demand*

It will be assumed that the cars are standing at the 1st floor with the doors closed and with no stop calls registered. Under these conditions, the door relay Y and the up direction relay W for car A are energized. The circuit for relay Y is L+1, 19, 23', Y, L—1. The circuit for relay W is L+1, D6, X2, J2, W, 30T, L—1. The same relays for cars B and C are also energized.

In the following operation, it will be assumed that waiting passengers at the 4th and 5th floors operate the down call buttons 4D and 5D to cause a car to stop for them and that some seconds later waiting passengers at the 6th and 7th floors operate the up and down buttons 6U and 7D to cause a car to answer them. It will be assumed further that the calls at the 6th and 7th floors will be answered by car A and that car B will start up and be stopped and reversed at the 5th floor to answer the down calls at the 5th and 4th floors because the period of waiting or length of time they have remained unanswered has resulted in a service demand.

This operation will be effected by the following actions:

The operation of the down button 5D energizes the down call registering relay 5DR by the circuit L+5, 5D, 5DR, 51, L—5, to close its self-holding contacts 5DR1 and its contacts 5DR5 and opens its back contacts 5DR2, 5DR3 and 5DR4. The closed contacts 5DR1 maintain the relay 5DR in an energized condition to maintain the stopping contacts g5 for car A, Bg5 for car B and Cg5 for car C in energized condition until the call is answered.

The closed contacts 5DR5 energize the clutch winding 67M and the armature TMA of the timing relay TM by the circuit L+11, 5DR5, R5 to a point 82; thence in parallel through 67M in parallel with TM1, TMA to a point 83 and thence in series through ZM1, BZM1, CZM1, L—11. The energization of the clutch winding 67M connects the shaft of the timing motor to the shaft operating the contact cams of the timing relay TM and the motor now starts to rotate the cams to open the contacts TM1 and to close the contacts TM2 and TM3 at the end of the timing period, thus providing a means for measuring the down service demand in the middle zone. The opening of the contacts 5DR2, 5DR3 and 5DR4 deenergizes the no-call above circuit 50 for all cars to keep them from reversing.

The operation of the push button 4D energizes the down call registering relay 4DR by the circuit L+5, 4D, 4DR, 51, L—5. The energized relay 4DR closes its self-holding contacts 4DR1 and its contacts 4DR5 and opens its contacts 4DR2, 4DR3 and 4DR4. The closing of the contacts 4DR1 maintains the relay 4DR in an energized condition and also energizes the stopping contacts g4 for car A, Bg4 for car B and Cg4 for car C so that the first car to approach in the correct direction will stop in answer to the call. The opening of the contacts 4DR2, 4DR3 and 4DR4 also opens the no-call above circuits 50 to prevent energization of the no-call above relay K of any car below the 4th floor as long as that call remains unanswered.

The closing of the contacts 4DR5 increases the current flow through the timing relay TM by inserting the resistor R4 in parallel with the resistor R5 in the circuit to the armature TMA. Inasmuch as this call was registered shortly after the down call at the 5th floor, the speed of the timing motor will increase under the urge of the additional supply of current to approximately twice its former speed. Hence, the timing motor may now reach the point at which it will operate its switch contacts in 35 or 40 seconds to indicate that a service demand exists in the middle zone; that is, that the two down calls in the middle zone have remained unanswered for a period sufficient to create a service demand which will cause some car to make an effort to answer them promptly without answering more recently registered calls.

It will be assumed now that the attendant in car A closes the car switch CS temporarily and thereby starts that car upwardly by energizing the up direction switch U and the car running relay M by the circuit L+1, CS, CS1, W1, F1, STU, U, M, 23, L—1.

The energized relay M closes its contacts M1, M2 and M3 and opens its contacts M4 to prepare the control system of car A for operation.

The energized up direction switch U closes its contacts U1, U2, U3, U4 and U5 and opens its contacts U6. The closing of the contacts U2 and U3 energizes the field winding GF of the generator G to start the car by the circuit L+1, U2, GF, U3, R1, L—1. The closing of the contacts U1 energizes the brake coil 20 by the circuit L+1, 20, U1, L—1. The energizaton of the coil 20 releases the brake 15 and the car starts upwardly.

The closing of the contacts U4 energizes the high speed relay V by the circuit L+1, U4, VTU, E1, V, L—1 and that relay thereupon closes its contacts V1 and thereby short-circuits the resistor R1 to increase the energization of the generator field winding and thus cause the car to run at its normal high speed.

The closing of the contacts U5 provides a self-holding circuit for the up switch U so that the car switch CS may be returned to its off position, leaving the car under the control of its decelerating and stopping inductor relays E and F.

The car now moves upwardly at normal speed and at this time the operation of the up button 6U at the 6th floor energizes the up call registering relay 6UR by the circuit L+5, 6U, 6UR, L—5. The energized relay 6UR closes its self-holding contacts 6UR1 and opens its contacts 6UR2, 6UR3 and 6UR4. The closing of the contacts 6UR1 maintains the relay 6UR in an energized condition and energizes the stopping contacts b6 for car A, Bb6 for car B and Cb6 for car C so that the first car to approach in the up direction will be stopped at that floor. The opening of the contacts 6UR2, 6UR3 and 6UR4, will prevent energization of the no-call above relays K for the cars until the call at the 6th floor is answered. Inasmuch as the service demand part of this system is not connected for the up calls, the energization of the up call registering relay 6UR for the 6th floor has no effect on the timing relays.

At this time, the down button 7D for the 7th floor is operated and energizes the down relay 7DR by the circuit L+5, 7D, 7DR, L—5 to close its self-holding contacts 7DR1 and its contacts 7DR5 and open its contacts 7DR2, 7DR3 and 7DR4. The closed contacts 7DR1 maintain the relay 7DR in energized condition and energizes the stopping contacts g7, Bg7 and Cg7 for stopping the next up car which arrives at the 7th floor. The opening of the contacts 7DR2, 7DR3 and 7DR4 will prevent energization of the no-call-above relays K for the cars as long as the down call at the 7th floor remains unanswered.

The closing of the contacts 7DR5 energizes the clutch 67T and the armature TTA of the timing relay TT for the top zone by the circuit L+11, 7DR5, R7, in parallel through 67T and through TT1, TTA, thence in series through ZT1, BZT1, CZT1, L—11. The energized clutch connects the motor shaft 63 to the shaft 66 for operating the contacts TT1, TT2 and TT3 when the motor reaches the end of its timing period as determined by the amount of current flowing through the resistor R7.

Returning to the movement of car A from the 1st floor, as it arrives at the second floor, its floor selector brush 34 engages the contact segment d2 but the no-call-above relay remains unenergized because the hall calls registered at the 4th and 5th floors have opened the circuit 50.

Also as car A enters the second floor area, its selector brush 40 engages the contact segment e2 and thereby energizes its bottom zone relay ZB by the circuit L+8, ZB e2, 40, L—8 to open its contacts ZB1 and close its contacts ZB2. The opening of the contacts ZB1 opens one branch of the circuit to the timing relay TB, but nothing happens because there are no down calls in the bottom zone. The closing of the contacts ZB2 in the circuits of the service demand reversing relay Q has no effect because the contacts TB2 therein are open.

As car A approaches the third floor, its brush 40 engages the contact segment e3, but it is included in the bottom zone and does not change the operation of relay ZB.

As car A leaves the 3rd floor and approaches the 4th floor, its brush 40 leaves the contact segment e3, thus deenergizing the zone relay ZB, and engages the contact segment e4, thereby energizing the middle zone relay ZM by the circuit L+8, ZM e4, 40, L—8. The energized relay ZM opens its contacts ZM1 and closes its contacts ZM2, ZM3, ZM4 and ZM5. The opening of contacts ZM1 opens one circuit for the energized timing relay TM, but inasmuch as the contacts X8 in parallel therewith are closed, the timing motor remains energized. The closing of the contacts ZM2 closes one gap in the circuit of the service demand reversing relay Q, but nothing happens because other contacts therein are open. The closing of the contacts ZM3, ZM4 and ZM5 in the circuits of the service demand by-passing relays P has no effect because other contacts in these circuits are open.

As car A leaves the 4th floor and approaches the 5th floor, its brush 40 leaves the contact segment e4 and engages the contact segment e5 thus maintaining the zone relay ZM in energized condition.

As car A leaves the 5th floor and approaches the 6th floor, its brush 40 leaves the contact segment e5 thus deenergizing the zone relay ZM for car A and engages the contact segment e6 thereby energizing the zone relay ZT for car A for the top zone, by the circuit L+8, ZT, e6, 40, L—8. The energized relay ZT opens its contacts ZT1 and closes its contacts ZT2, ZT3 and ZT4. The opened contacts ZT1 open one branch of the circuit for the timing relay TT, but that relay remains energized by reason of the parallel circuit through the contact X7.

The closing of the contacts ZT2 closes one gap in the circuit for the by-passing relays Q but has no effect because other contacts in the circuits are open. The closing of the contacts ZT3 and ZT4 closes gaps in the circuits for the by-passing relays BP and CP, but inasmuch as other gaps therein are open, these relays are not energized.

While car A is now about ready to stop at the 6th floor, it will be assumed that the attendant in car B closes his car switch BCS temporarily and thereby starts that car upwardly by energizing its up direction switch BU and its car running relay BM in the same manner as car A was started. Car B now moves upwardly into the middle zone operating its zone relays BZB and BZM in a manner similar to the operation of the zone relays of car A.

It will also be assumed that such time has elapsed as has permitted the energized timing relay TM (under the action of the down buttons 4D and 5D) to reach the point where, because of the expiration of the total time the down calls at the 4th and 5th floors have remained unanswered, it opens its contacts TM1 and TM3 and closes its contacts TM2 and TM4. The closing of the contacts TM4 in one of the circuits of the by-passing relays P, BP and CP has no effect because of other open contacts in their circuits. The opening of the contacts TM1 deenergizes the armature TMA and thus stops the timing motor, with the timing contacts in their actuated position. However, the clutch winding 61M remains energized and the timing relay contacts will remain in operated position until the down calls at the 4th and 5th floors are answered or a car is conditioned to answer them.

The closing of the contacts TM2 energizes the special service reverse relay BQ by the circuit L+11, TT3, TM2, BZM2, BH3, BQ, BX10, L—11, to close its contacts BQ1, BQ2 and BQ3, and thereby cause car B to stop and reverse at the highest down call in the middle zone.

The closed contacts BQ1 energize the anti-by-pass relay BL by the circuit L+9, BQ1, BL, BTL, BBL, L—9, to close its self-holding contacts BL1 and to open its contacts BL2 to prevent operation of the by-passing relay BP for car B while it is answering the special service demand and until it reaches the bottom terminal.

It should be observed here that the circuit of the anti-by-passing relay L of each car is controlled by contacts (such as Q1 and P1) of either its by-passing relay P or its service demand reversing relay Q and also by its self-holding contacts L1 and bottom limit switch BL. Hence, if a car is once conditioned for a special demand action, either reversal or by-pass, during a trip, its anti-by-pass relay L will lock in and prevent another by-pass or reversal action of that car during that round trip. That is, a car can be subjected to only one special action during a round trip.

The closing of the contacts BQ2 and BQ3 energizes the low and the middle zone sections of the hall call above relay conductor B50. Inasmuch as car B is in the middle zone and the contacts BQ2 are closed and the contacts 5DR3 and 4DR3 are open, the floor call above relay BK is energized when the selector brush B34 engages the contact segment Bd5 as car B approaches the 5th floor, by the circuit L+9, BQ2, Bd5, B34, BK, L—9.

The energized relay BK closes its contacts BK1 thereby energizing the high call reversing relay BJ by the circuit L+9, BJ, BH1, BK1, BW8, L—9 to open its contacts BJ2 and close its contacts BJ1, BJ3 and BJ4. The closing of the contacts BJ3 and BJ4 closes self-holding circuits for the relay J. The opened contacts BJ2 open one circuit for the up direction relay BW so that as soon as the car B is stopped, the relay BW will be deenergized to reverse the direction of operation for the car.

The closing of the contacts BJ1 causes the car to stop in the following manner. The closed contacts BJ1 energize the holding relay BG and the decelerating relay BE by the circuit L+2, BJ1, to a point 84, in parallel through BG and BE to 85, thence BM1, L—2. The energized relay BG closes its contacts BG1 to maintain the circuits of the decelerating and stopping relay circuits until the stopping operation is completed.

As car B approaches the 5th floor, it moves the energized relay BE to a position adjacent to the decelerating inductor plate BUEP for the 5th floor which causes its contacts BE1 and BE2 to open. The opening of the contacts BE1 deenergizes the high speed relay BV to open its contacts BV1 and close its contacts BV2. The opening of the contacts BV1 restores the resistor BR1 to the circuit of the generator field winding BGF to decelerate car B to its stopping speed. The closing of the back contacts BV2 energizes the stopping relay BF by the circuit L+2, BG1, BV2, BF, 85, BM1, L—2.

As car B approaches within stopping distance of the 5th floor, it brings the inductor relay BF opposite the inductor plate BUFP for the 5th floor and thereby opens the contacts BF1 and BF2. The opening of the contacts BF1 deenergizes the up switch BU and the car running relay BM for car B, thereby causing the switch BU to open its contacts BU1, BU2, BU3, BU4 and BU5 and close its contacts BU6 and also causing the relay BM to open its contacts BM1, BM2, BM3 and close its contacts BM4 to stop the car at the 5th floor.

The opening of the contacts BU2 and BU3 deenergizes the generator field winding BGF, thus deenergizing the hoisting motor B14 to stop the car. The opening of the contacts BU1 deenergizes the brake coil B24 and thereby applies the brake to hold the car at the 5th floor. The opening of the contacts BU5 opens the self-holding circuit for the up switch BU thereby returning the car to the control of the starting switch BCS.

The opening of the contacts BM1 deenergizes the inductor holding relay BG, the decelerating inductor relay BE and the stopping inductor relay BF, thus restoring the inductor relays to normal condition. The opening of the contacts BM2 opens the second circuit for the up direction preference relay BW which thereupon opens its contacts BW4 to deenergize the holding coils 2cc, etc., and closes its back contacts BW2 to energize the down direction preference relay BX of car B by the circuit L+2, BU6, BW2, BX, B30B, L—2.

The energized down direction relay BX closes its contacts BX1, BX3, BX4, BX5, BX6 and BX11 and opens its contacts BX2, BX7, BX8, BX9 and BX10. The closed contacts BX4 energize the car button retaining coils 2CC, etc. for down direction operation. Car B is now stopped at the 5th floor and its control relays have been conditioned for down operation so that the next operation of the car switch will move the car downwardly.

The closed contacts BX6 energize the cancelling coil 5DRN by the circuit L+5, 5DR1, 5DRN, B/5, B41, BX6, BM4, L—6 to deenergize the coil of relay 5DR and cause it to return to its normal condition and thereby cancel the down call registered at the 5th floor. The deenergized relay 5DR also opens its contacts 5DR5 in the circuit of the timer TM.

Inasmuch as car B is in the middle zone thus opening the zone contacts BZM1, the opened contacts BX8 open the circuit for the clutch 87M associated with the timing motor TM to permit the cam wheels associated therewith to return to their normal position, thus closing the contacts TM1 and TM3 and opening the contacts TM2 and TM4 to deenergize the demand reversing relay BQ.

The opened contacts BX10 open a gap in the circuit of the service demand reversing relay BQ which will prevent it from again being energized until car B is on an up trip.

However, the anti-pass relay BL for car B will remain in its energized condition because of its holding contacts BL1 and thereby prevent any operation of the by-passing relay BP of car B until that car returns to the ground floor. This illustrates how one service demand operation of a car will prevent it from being again reversed or from being operated to by-pass during the remainder of that trip; that is, only one special action can be rendered per car per trip.

It will be assumed now that the attendant opens the car door of car B as well as the hatchway door at the 5th floor, thus opening the door contacts B19 and B22 and deenergizing the door relay BY to open its contacts BY1. The open contacts BY1 deenergize the high call reversing call relay BJ and return it to its normal condition because car B is no longer an up moving car.

By the foregoing operation, it will be seen that the existence of a service demand at down floors in one of the zones will cause an up moving car, without any car calls above it to stop when it reaches that zone and reverse its direction of operation. It will also be apparent that the car will stop and reverse at the highest down call in that zone because of the operation of the special service reverse relay BQ closing its contacts BQ2 and BQ3 to energize the no call above relay BK of car B when the car reaches the highest down call. When relay BK is energized, it energizes the high call reversing relay J to stop the car and change its direction preference relays so that the next time it starts it will move in the down direction.

It will be assumed now that the down passenger at the 5th floor enters the car and the attendant closes the car gate and hatchway door and then closes the starting switch BCS to start the car. Inasmuch as the up direction relay BW has been deenergized and the down direction relay BX has been energized for down direction operation, the closing of the switch BCS energizes the down direction switch BD of car B by the circuit L+2, BCS, BCS1, BX1, BF2, BSTD, BD, BM, B23, L—2. The energized switch BD closes its contacts BD1, BD2, BD3, BD4 and BD5 and opens its contacts BD6. The closed contacts BD1 and BD3 energize the field winding BGF of the generator BG to start the car downwardly by the circuit L+2, BD3, BGF, BD1, BR1, L—2. The closed contacts BD2 energize the coil B20 to release the brake 15 and the car now starts downwardly.

As car B moves downwardly toward the 4th floor, its selector brush B42 engages the down contact segment Bg4 and thereby energizes the stopping relay BS by the circuit L+5, 4DR1, Bg4, B42, BX5, BS, BP1, L—6.

The energized stopping relay BS closes its contacts BS1 thereby energizing the holding relay FG and the decelerating inductor relay BE by the circuit L+2, BT1, BG and BE in parallel, BM1, L—2. The energized relay BG closes its contacts BG1 to maintain the decelerating and stopping relays in energized condition until the stop at the 4th floor is completed.

As car B moves closer to the 4th floor, it brings its decelerating inductor relay BE opposite the down inductor plate BDEP for the 4th floor which causes it to open its contacts BE1 and BE2. The opening of the contacts BE2 deenergizes the high speed relay BV to open its contacts BV1 and thereby replace the resistor BR1 in the circuit of the field winding of the generator to decelerate the car from its normal high speed to its stopping speed. The deenergized relay BV also closes its contacts BV2 thereby energizing the inductor stopping relay BF as previously described. As the car approaches more closely to the 4th floor, it brings the inductor relay BF opposite the down stopping inductor plate DFP for the 4th floor which causes it to open its contacts BF1 and BF2. The opening of the contacts BF2 deenergizes the down direction switch BD and the car running relay BM. The deenergized relay BD opens its contacts BD1 and BD3 to deenergize the generator and opens its contacts BD2 to deenergize the brake coil B20 and thereby apply the brake B15 to hold the car at the 4th floor.

Car B is now stopped at the 4th floor and the deenergized relay BM opens its contacts BM1 to deenergize the inductor relays BE and BF and also closes its contacts BM4, thus energizing the cancelling coil 4DRN by the circuit L+5, 4DR1, 4DRN, B/4, B41, BX5, BM4, L—5 to deenergize the energized coil 4DR and thereby cancel the down call registered at the 4th floor.

It will be assumed now that the attendant opens the car door, that the waiting down passenger at the 4th floor enters, and that the attendant closes the door and rotates the car switch to starting position, whereupon car B resumes its downward trip and moves into the lower terminal. While completing its downward trip, car B can stop and pick up down calls at the 2nd and 3rd floors provided such down calls are registered sufficiently ahead of the movement of the car to give it time to stop.

As the car moves into the lower terminal, its cam switches BVTD, B30B, BSTD and BBL are operated to decelerate the car, stop it, condition the direction preference relays BW and BX for up operation, and restore the anti-by-pass relay BL to its normal condition.

The assumed operation of car A as it approaches the 6th floor will now be resumed. As car A moves from the 5th to the 6th floor, its selector brush 32 engages the contact b6 and thereby energizes the stopping relay S of car A by the circuit L+5, 6UR1, b6, 32, W5, S, P1, L—5. The energized relay S closes its contacts S1, thereby energizing the holding relay G and the decelerating inductor relay E by the circuit L+1, S1, in parallel through G and E, then through M1, L—1. The energized relay G closes its contacts G1 to provide a holding circuit for the decelerating and stopping relays E and F.

As car A continues further toward the 6th floor, it brings the inductor relay opposite the up inductor plate UEP for the 6th floor which causes the contacts E1 and E2 to open. The opening of the contacts E1 deenergizes the high speed relay V to open its contacts V1 and thereby restore the resistor R1 to the circuit of the generator field winding GF, thus decelerating the car from its normal high speed to its stopping speed. The closing of the contacts V2 energizes the stopping inductor relay F by the circuit L+1, G1, V2, F, M1, L—1.

As car A approaches to within stopping distance of the 6th floor, it moves the inductor stopping relay F into position adjacent the up stopping inductor plate UFP for the 6th floor, which causes the inductor contacts F1 and F2 to open. The opening of the contacts F1 deenergizes the up switch U and car running relay M, thereby causing the switch U to open its contacts U1, U2, U3, U4 and U5 and close its contacts U6, and also causing the relay M to open its contacts M1, M2, and M3 and close its contacts M4 to stop the car at the 6th floor.

The opening of the contacts U2 and U3 deenergizes the generator field winding GF, thus deenergizing the hoisting motor 14 for stopping the car. The opening of the contacts U1 deenergizes the brake coil 20 and thereby applies the brake 15 to stop and hold car A at the 6th floor. The opening of the contacts U5 opens the self-holding circuit for the up switch U, thereby returning the car to the control of its starting switch CS.

The opening of the contacts M1 deenergizes the holding relay G, the decelerating inductor relay E and the stop inductor relay F, thus restoring the inductor relays to normal condition. The closing of the contacts M4 energizes the cancelling coil 6URN by the circuit L+5, 6UR1, 6URN, c6, 33, W6, M4, L—5 to deenergize the coil 6UR and thus cancel the up call registered at the 6th floor.

It will be assumed now that the up passenger at the 6th floor enters the car and that the attendant closes the car gate and hatchway door and then closes the starting switch CS, and thereby starts the car upwardly in the same manner as it was started from the first floor.

It will be recalled that the down relay 7DR was energized as a result of the operation of the down button 7D for the 7th floor. When the up passenger at the 6th floor enters the car the attendant undoubtedly would operate the car button for the 7th floor. Either or both of these agencies causes the car A to move upwardly and stop at the 7th floor or upper terminal.

As the car A approaches the 7th floor the top limit switch 30T operates to condition the car for a reversal in its direction of travel. Also the brush 41 engages the contact f7 to cancel the down call at the 7th floor. Car A now stands at the upper terminal ready for a down trip and cars B and C stand at the lower terminal ready for up operation.

*Car by-passes calls to answer service demand*

It will be assumed that cars A and B have been operated on up trips and have started down and are approaching the 5th floor, that car C has started on an up trip and is in the top zone, that a down call exists at the 4th floor, that calls of long duration amounting to a service demand exist at the 2nd and 3rd floors in the low zone which will cause car B to by-pass the existing down call at the 4th floor and move on down to stop and pick up the service demand calls at the 2nd and 3rd floors and then proceed downwardly to the bottom terminal.

The down call at the 4th floor was registered by a waiting down passenger pressing the down button 4D, thereby energizing the down call registering relay 4DR by the circuit L+5, 4D, 4DR, 51, L—5. The energized relay 4DR closes its self-holding contacts 4DR1 and energizes the segment g4 to stop the next down car prepared to stop at that floor. Relay 4DR also closes its contacts 4DR5 but they fail to energize the timing relay TM because car A has moved down into the middle zone, thus opening the middle zone contacts ZM1 and also opening the contacts X5 of its down direction preference relay X in the circuit of the timing relay TM. Therefore, the down call at the 4th floor will not start its timing relay TM in operation while there is a car in its own zone to answer it.

The down call at the 3rd floor was registered by a waiting down passenger pushing the down button 3D, thereby energizing the down call registering relay 3DR by the circuit L+5, 2D, 3DR, 51, L—5 to close its self-holding contacts 3DR1 and its contacts 3DR5 and open its back contacts 3DR3 and 3DR4. The closed contacts 3DR1 maintain the relay 3DR in an energized condition to maintain the stopping contacts g5 for car A, Bg5 for car B and Cg5 for car C in energized condition until the call is answered.

The closed contacts 3DR5 energize the clutch winding 67B and the armature TBA of the timing relay TB by the circuit L+11, 3DR5, R3, TB1, TBA, ZB1, BZB1, CZB1, L—11. This same circuit also includes the clutch winding 67B in parallel with the armature TBA so that the clutch winding is energized to connect the shaft of the timing motor to the shaft operating the contact cams of the timing relay TB and the timing motor now starts to rotate the cams to open the contacts TB1 and to close the contacts TB2 and TB3 at the end of the timing period, thus providing a means for setting up a service demand in the low zone.

The down call at the 2nd floor was registered by a waiting down passenger pressing the down button 2D thereat, thereby energizing the down call registering relay 2DR by the circuit L+5, 2D, 2DR, 51, L—5. The energized relay 2DR closes its self-holding contacts 2DR1 and its contacts 2DR5 thus energizing the down stopping contact segments g2, Bg2, and Cg2 of cars A, B and C for stopping the first down car prepared to stop thereat.

The pressing of the contacts 2DR5 increases the current flow through the timing relay TB by inserting the resistor R2 in parallel with the resistor R3 in the circuit to the armature TBA. Inasmuch as this call was registered shortly after the down call at the 3rd floor, the speed of the timing motor will increase under the urge of the additional supply of current to approximately twice its former speed. Hence the timing motor may now reach the point at which it will operate its cam contacts in 35 or 40 seconds to indicate that a service demand exists in the low zone; that is, that the two down calls in the low zone have remained unanswered for a period sufficiently long to create a service demand which will cause some "idle" car to make an effort to answer them promptly without answering a more recently registered call.

It will be assumed now that the calls at the 2nd and 3rd floors are so old that the timing motor TB has opened its cam contacts TB1 to stop the armature TBA and has closed its cam contacts TB2 and TB3 to prepare the circuits of the by-passing relays P, BP and CP and the demand reversing relays Q, BQ and CQ for operation to cause some "idle" car to answer the service demand calls.

Inasmuch as cars A and B are on a down trip, the contacts X10 and BX10 of their down direction relays are open in the circuit of their service demand reversing relays Q and BQ, thus preventing the energization of those relays. Also, inasmuch as car C is moving upwardly in the top zone and is not in the bottom zone, its bottom zone contacts CZB2 are open and its service demand reversing relay CQ cannot be energized. Hence, no car will be stopped and reversed to answer the service demand in the low zone.

Inasmuch as no car is available for a reversing action to answer the down service demand in the down zone but cars A and B are entering the middle zone on down trips, one of them will be caused to by-pass the 4th floor call and answer the service demand calls at the 3rd and 2nd floors.

With cars A and B moving down at the 5th floor, the contacts X11 and BX11 of their down direction relays are closed and the contacts ZM3, ZM4, BZM3 and BZM4 of the middle zone relays are closed. The closing of these contacts completes circuits for energizing the by-passing relays P and BP.

However, the relays P and BP have interlocking contacts in their circuits and only one of them will be energized and that one will be the one which picks up most rapidly. It will be assumed in this instance that the relay BP of car B picks up before the relay P of car A and causes car B to by-pass the call at the 4th floor to answer the service demand calls at the 2nd and 3rd floors. The relay BP is energized by the circuit L+11, TB3, ZM4, BZM4, BX11, BP, P4, CP4, BL2, L—11 to immediately open its interlocking contacts BP3 and BP5 to prevent operation of the by-passing relays P for car A and CP for car C, and at the same time to close its self-holding contacts BP4 so that it will remain energized until car B leaves the middle zone and enters the low zone.

The energized relay BP also opens its contacts BP1 and thereby renders the hall call stopping relay BS of car B ineffective to stop that car at any down call in the middle zone. Hence, as it moves downwardly, it will by-pass any down hall calls in that zone.

The energized relay BP also closes its contacts BP2 and thereby energizes the anti-by-passing relay BL of car B by the circuit L+9, BP2, BL, BTL, BBL, L—9, to close its contacts BL1 to maintain itself energized until car B arrives at the bottom terminal and opens its contacts BL2 to prevent the by-passing relay BP of car B from being operated again until after car B arrives at the bottom terminal, thereby providing a means which will prevent the car from being subjected to more than one by-passing operation in any one trip.

It will be assumed now that the cars A and B continue their down operation, and approach the 4th floor.

Inasmuch as the hall call relay BS of car B has been rendered ineffective by the service demand opening the contacts BP1, that car will by-pass the down call at the 4th floor and move on down to answer the demand calls at the 3rd and 2nd floors in the low zone.

Inasmuch as the hall call stopping relay S of car A has not been rendered ineffective by the service demand, it will be energized as car A in moving downwardly causes its floor selector arm 17 to move its brush 42 into contact with the stopping segment g4, by the circuit L+5, 4DR1, g4 42, X5, S, P1, L—5. The energized relay S will close its contacts S1 and thereby energize the decelerating inductor relay E and the inductor holding relay G, by the circuit L+1, S1, in parallel through G and E, then through M1, L—1. The energized inductor holding relay G and the inductor relay E will now effect the stopping of car A at the 4th floor in the same manner as it was stopped at the 6th floor up-call in the previously described operation.

Returning now to the down operation of car B, as it leaves the 4th floor and enters the low zone by approaching the 3rd floor while car A is stopping at the 4th floor, the brush B40 on its floor selector arm B17 leaves the zone contact Be4 thereby deenergizing the zone relay BZM which opens its contacts BZM4 and thereby deenergizes the by-passing relay BP. The deenergized relay BP closes its back contacts BP1 and thereby restores the hall call stopping relay BS of car B to its normal condition for answering any down stop calls below the car.

The deenergized relay BP also closes its back contacts BP3 and BP5 so that the by-pass relay of either of the other cars may now be operated to by-pass when another service demand occurs.

As car B enters the bottom zone, its zone brush B40 engages the contact segment Be3 and thereby energizes its bottom zone relay BZB by the circuit L+9, BZB, Be3, B40, L—9, to open its contacts BZB1 and BZB2. The opening of the contacts BZB1 deenergizes the clutch coil 67B associated with the timing relay TB to permit its cam wheels to return to their normal position, thus closing the contacts TB1 and opening the contacts TB2 and TB3, and thereby restoring the timing relay TB to its normal condition.

The service demand in the bottom zone has now been cancelled because car B is in that zone and has been restored to normal condition to answer the down calls at the 3rd and 2nd floors therein.

As car B moves down to the 3rd floor, it moves its selector arm B17 to bring the down brush B42 into engagement with the energized stopping segment Bg3 and thereby energizes its stopping relay BS by the circuit L+5, 3DR1, Bg3, B42, BX5, BP1, L—6. The energized relay BS closes its contacts BS1 and thereby energizes the decelerating inductor relay BE and the inductor holding relay BG by the circuit L+2, BS1, in parallel through BG and BE, then through 85, BM1, L—2. The energized relay BG closes its contacts BG1 to maintain the inductor relay circuits during the stopping operation.

As car B approaches closer to the 3rd floor, it moves the energized relay BE opposite the down inductor plate BDEP for the 3rd floor which causes the relay to open its contacts BE1 and BE2. The opening of the contacts BE2 deenergizes the high speed relay BV to open its contacts BV1, and thereby replace the resistor BR1 in the circuit of the field winding BGF to decelerate car B from its normal high speed to its stopping speed. The deenergized relay BV also closes its contacts BV2, thereby energizing the inductor stopping relay BF as previously described. As car B approaches more closely to the 3rd floor, it brings its inductor relay BF opposite the down stopping inductor plate BDFP for the 3rd floor which causes the relay to open its contacts BF1 and BF2. The opening of the contacts BF2 deenergizes the down direction switch BD and the car running relay BM. The deenergized relay BD opens its contacts BD1 and BD3 to deenergize the generator BG and opens its contacts BD2 to deenergize the brake coil B20, thus stopping the car and holding it at the 3rd floor.

Car B is now stopped at the 3rd floor and the deenergized relay BM opens its contacts BM1 to deenergize the inductor relays BE and BF and also closes its contacts BM4, thus energizing the cancelling coil 3DRN by the circuit L+5, 3DR1, 3DRN, B/3, B41, BX6, BM4, L—6 to deenergize the energized coil 3DR and thereby cancel the down call registered at the 3rd floor.

It will be assumed now that the attendant opens the car door; that the waiting down passenger at the 3rd floor enters, and that the attendant closes the door and rotates the car switch to starting position whereupon car B resumes its downward trip and approaches the 2nd floor, thus causing its selector brush B42 to engage the down stopping segment Bg2 and thereby energize the stopping relay BS by the circuit L+5, 3DR1, Bg2, B42, BX5, BS, BP1, L—6.

The energized stopping relay BS closes its contacts BS1, thereby energizing the holding relay BG and the decelerating inductor relay DE as previously described.

As car B moves closer to the second floor, it brings its decelerating inductor relay BE opposite the down inductor plate BDEP for the second floor which causes it to open its contacts BE1 and BE2 to decelerate the car as previously described. As the car approaches more closely to the 2nd floor, it moves its inductor relay BF adjacent to the down stopping inductor plate BDFP for the 2nd floor which causes it to open its contacts BF1 and BF2, and thereby effect the stopping of car B at the 2nd floor in the manner previously described.

Car B is now stopped at the 2nd floor and its deenergized relay BM opens its contacts BM1 to deenergize the inductor relays and also opens its contacts BM4, thus energizing the cancelling coil 2DRN by the circuit L+5, 2DR1, 2DRN, B/2, B41, BX6, BM4, L—6 to deenergize the call registering relay 2DR, and thereby cancel the down registered call at the 2nd floor.

As the relay 2DR is deenergized, it opens its contacts 2DR5 and thereby completely restores the circuit of the timing relay TB to its normal condition.

It will be assumed now that the waiting passenger at the 2nd floor enters the car, that the attendant closes the door and operates the starting switch BCS, and that the car moves down to and stops at the bottom terminal. As car B stops at the bottom terminal, it opens its limit switch B30D to deenergize the down direction preference relay DX which in turn energizes the up direction preference relay BW so the car B is now ready to start upwardly. Also, as car B reaches the bottom terminal it operates its limit switch BDL, thereby deenergizing its anti-by-passing relay BL. Thus car B is now restored for normal operation in which it may stop and reverse while moving upwardly or by-pass while moving downwardly to answer a service demand.

By the foregoing operation it will be seen that I have provided an automatic control system which will cause an "idle" up car or an "idle" down car to move to and answer long unanswered calls in another zone from that in which it is operating; that is, when a service demand is set up in a zone by long unanswered calls in that zone, such service demand will cause a car which is not needed in another part of the system to move to and answer the service demand calls.

It will also be observed that no car in the system can be caused to answer more than one service demand operation during a trip and that any one service demand will not cause more than on car to answer it, but that successive service demands may cause successive cars to answer them.

Although I have illustrated and described only one embodiment of my invention in connection with a simple elevator control system, it will be apparent that many changes and modifications may be made therein and that it may be applied to various elevator control systems without departing from the spirit and scope of my invention.

I claim as my invention:

1. In an elevator control system for a plurality of cars operable past a plurality of floors, a stop call device at each floor for storing calls for service and for causing a car to stop at that floor, means for dividing the floors into a plurality of zones each including a plurality of floors, a timer for each zone responsive to one or more stop call devices in that zone remaining unanswered for a predetermined total length of time for indicating a service demand therein, and means responsive to operation of a timer when a service demand exists in its zone for conditioning the operating means of a car to answer the calls stored on the stop call devices in the service demand zone before answering calls in other zones.

2. In an elevator system for operating a plurality of cars serving a plurality of floors, an up stop call device for each floor, a down stop call device for each floor, a stopping means for each car, a reversing means for each car, means responsive to operation of a stop call device at a floor for operating the stopping means of a car approaching in the direction of the operated call device, a plurality of zoning devices for each car and responsive thereto for dividing the floors into a plurality of zones, a timer for each zone, means responsive to one or more down call devices in a zone remaining in operated condition until a predetermined service demand exists in that zone for causing a service demand operation of the timer for that zone, and means responsive to the service demand operation of a timer for operating the stopping means and the reversing means of an up moving car in the zone of that timer at the floor of the highest down call in that zone to answer the service demand therein or for causing one of a plurality of down cars in the zone above the zone of that timer to by-pass the calls ahead of it until it moves into the zone of the service demand operated timer to answer the service demand therein.

3. In an elevator system for operating a plurality of cars serving a plurality of floors, an up stop call device for each floor, a down stop call device for each floor, a stopping means for each car, a reversing means for each car, means responsive to operation of a stop call device at a floor for operating the stopping means of a car approaching in the direction of the operated call device, a plurality of zoning devices for each car and responsive thereto for dividing the floors into a plurality of zones, a timer for each zone, means responsive to one or more down call devices in a zone remaining in operated condition until a predetermined service demand exists in that zone for causing a service demand operation of the timer for that zone, means responsive to the service demand operation of a timer for operating the stopping means and the reversing means of an up moving car in the zone of that timer at the floor of the highest down call in that zone to answer the service demand therein or for causing one of a plurality of down cars in the zone above the zone of that timer to by-pass the calls ahead of it until it moves into the zone of the service demand operated timer to answer the service demand therein, and means responsive to one service demand operation of a car during a trip for preventing another service demand operation of that car during that trip.

4. An elevator system comprising a plurality of cars for serving a plurality of floors, a stopping means for each car, a reversing means for each car, up call devices and down call devices associated with the floors for causing operation of the stopping means of the first car to approach the floor of an operated call device in the direction of the operated call device, car call devices in each car for registering stops to let off passengers, a plurality of zoning devices individual to each car for dividing the floors into a plurality of zones, means responsive to the presence of a car in a zone for operating its zoning device for that zone, a timer for each zone for indicating a service demand in that zone after a predetermined operation, means responsive to operation of a down call device in a zone for starting the timer for that zone, means responsive to the presence of a down car in a zone for preventing operation of the timer for that zone and for restoring it to its normal condition if it is in operation, a by-passing device for each car, a reverse service device for each car, means operably responsive to a timer indicating a service demand in its zone for preparing the by-passing devices and the reverse service devices for operation, means responsive to the presence of an up moving car in the zone of a timer indicating a service demand for operating the reverse service device of that car, means responsive to operation of the reverse service device of a car when it is in a zone for causing operation of its stopping means at the floor of the highest down call in that zone and for operating its reversing means to change it to a down car in that zone, means responsive to the operation of a car call device of an up-moving car for a floor above it for preventing operation of its reverse service device, means responsive to the presence of a plurality of down cars in the zone above the zone of a timer indicating a service demand for operating the by-passing means of one of said plurality of down cars, means responsive to operation of the by-passing device of a car for preventing operation of the by-passing devices of the other cars, means responsive to operation of the by-passing device of a car for preventing operation of the stopping means of that car by an operated hall call registering device until said car enters the zone of the timer indicating a service demand, whereby said car will by-pass calls in its zone to answer calls in the zone of the timer indicating the service demand.

5. An elevator system comprising a plurality of cars for serving a plurality of floors, a stopping means for each car, a reversing means for each car, up call devices and down call devices associated with the floors for causing operation of the stopping means of the first car to approach the floor of an operated call device in the direction of the operated call device, car call devices in each car for registering stops to let off passengers, a plurality of zoning devices individual to each car for dividing the floors into a plurality of zones, means responsive to the presence of a car in a zone for operating its zoning device for that zone, a timer for each zone for indicating a service demand in that zone after a predetermined operation, means responsive to operation of a down call device in a zone for starting the timer for that zone, means responsive to the presence of a down car in a zone for preventing operation of the timer for that zone and for restoring it to its normal condition if it is in operation, a by-passing device for each car, a reverse service device for each car, means operably responsive to a timer indicating a service demand in its zone for preparing the by-passing devices and the reverse service devices for operation, means responsive to the presence of an up moving car in the zone of a timer indicating a service demand for operating the reverse service device of that car, means responsive to operation of the reverse service device of a car when it is in a zone for causing operation of its stopping means at the floor of the highest down call in that zone and for operating its reversing means to change it to a down car in that zone, means responsive to the operation of a car call device of an up-moving car for a floor above it for preventing operation of its reverse service device, means responsive to the presence of a plurality of down cars in the zone above the zone of a timer indicating a service demand for operating the by-passing means of one of said plurality of down cars, means responsive to operation of the by-passing device of a car for preventing operation of the by-passing devices of the other cars, means responsive to operation of the by-passing device of a car for preventing operation of the stopping means of that car by an operated hall call registering device until said car enters the zone of the timer indicating a service demand, whereby said car will by-pass calls in its zone to answer calls in the zone of the timer indicating the service demand, and means responsive to one service demand operation of the by-passing device or the reverse service device of a car during a trip for preventing another service demand of that car during that trip.

6. In an elevator system for operating a plurality of cars serving a plurality of floors, a stop call device for each floor, a stopping means for each car, a reversing means for each car, means responsive to operation of a stop call device at a floor for operating the stopping means of a car approaching in the direction of the operated call device, a plurality of zoning devices for each car and responsive thereto for dividing the floors into a plurality of zones, and means responsive to one or more call devices for one direction in a zone remaining in operated condition until a predetermined service demand exists in that zone for operating the stopping means and the reversing means of a car travelling a direction opposite to the direction of the operated call device or call devices in that zone.

7. In an elevator system for operating a plurality of cars serving a plurality of floors, an up stop call device for each floor, a down stop call device for each floor, a stopping means for each car, a reversing means for each car, means responsive to operation of a stop call device at a floor for operating the stopping means of a car approaching in the direction of the operated call device, a plurality of zoning devices for each car and responsive thereto for dividing the floors into a plurality of zones, means responsive to one or more down call devices in a zone remaining in operated condition until a predetermined service demand exists in that zone for operating the stopping means and the reversing means of an up moving car in that zone at the floor of the highest down call in that zone to answer the service demand therein and means responsive to one service demand reversing operation of a car during a trip for preventing another service demand operation of that car during that trip.

8. In an elevator system for operating a plurality of cars serving a plurality of floors, an up stop call device for each floor, a down stop call device for each floor, car call devices in each car for registering stops to let off passengers, a stopping means for each car, a reversing means for each car, means responsive to operation of a stop call device at a floor for operating the stopping means of a car approaching in the direction of the operated call device, a plurality of zoning devices for each car and responsive thereto for dividing the floors into a plurality of zones, a timer for each zone, means responsive to one or more down call devices in a zone remaining in operated condition until a predetermined service demand exists in that zone for causing a service demand operation of the timer for that zone, means responsive to the service demand operation of a timer for operating the stopping means and the reversing means of an up moving car in the zone of that timer at the floor of the highest down call in that zone to answer the service demand therein, and means responsive to the operation of a car call device of an up moving car for a floor above it for preventing operation of its reversing means.

9. In an elevator system for operating a plurality of cars serving a plurality of floors, an up stop call device for each floor, a down stop call device for each floor, a stopping means for each car, a reversing means for each car, means responsive to operation of a stop call device at a floor for operating the stopping means of a car approaching in the direction of the operated call device, a plurality of zoning devices for each car and responsive thereto for dividing the floors into a plurality of zones, a timer for each zone, means responsive to one or more down call devices in a zone remaining in operated condition until a predetermined service demand exists in that zone for causing a service demand operation of the timer for that zone, means responsive to the service demand operation of a timer for operating the stopping means and the reversing means of an up moving car in the zone of that timer at the floor of the highest down call in that zone to answer the service demand therein, and means responsive to one service demand reversing operation of a car during a trip for preventing another service demand operation of that car during that trip.

10. An elevator system comprising a plurality of cars for serving a plurality of floors, a stopping means for each car, a reversing means for each car, up call devices and down call devices associated with the floors for causing operation of the stopping means of the cars as they approach the floors of operated call devices, a plurality of zoning devices individual to each car for dividing the floors into a plurality of zones, means responsive to the presence of a car in a zone for operating its zoning device for that zone, a timer for each zone for indicating the existence of a service demand in that zone, means responsive to operation of a down call device in a zone for starting the timer of that zone, means responsive to the presence of a down car in a zone for preventing operation of the timer for that zone and for restoring it to its normal condition if it is in operation, a reverse service device for each car, means responsive to operation of a timer indicating a service demand in its zone for preparing the reverse service devices for operation, means responsive to the presence of an up moving car in the zone of a timer indicating a service demand for operating the reverse service device of that car, and means responsive to operation of the reverse service device of a car when it is in a zone for causing operation of its stopping means at the floor of the highest down call in that zone and for operating its reversing means to change it to a down car in that zone.

11. An elevator system comprising a plurality of cars for serving a plurality of floors, a stopping means for each car, a reversing means for each car, up call devices and down call devices associated with the floors for causing operation of the stopping means of the cars as they approach the floors of operated call devices, a plurality of zoning devices individual to each car for dividing the floors into a plurality of zones, means responsive to the presence of a car in a zone for operating its zoning device for that zone, a timer for each zone for indicating the existence of a service demand in that zone, means responsive to operation of a down call device in a zone for starting the timer for that zone, means responsive to the presence of a down car in a zone for preventing operation of the timer for that zone and for restoring it to its normal condition if it is in operation, a reverse service device for each car, means responsive to operation of a timer indicating a service demand in its zone for preparing the reverse service devices for operation, means responsive to the presence of an up moving car in the zone of a timer indicating a service demand for operating the reverse service device of that car, means responsive to operation of the reverse service device of a car when it is in a zone for causing operation of its stopping means at the floor of the highest down call in that zone and for operating its reversing means to change it to a down car in that zone, and means responsive to one operation of the reverse service device of a car during a trip for preventing another operation thereof during that trip.

12. An elevator system comprising a plurality of cars for serving a plurality of floors, a stopping means for each car, a reversing means for each car, up call devices and down call devices associated with the floors for causing operation of the stopping means of the cars as they approach the floors of operated call devices, car call devices in each car for registering stops to let off passengers, a plurality of zoning devices individual to each car for dividing the floors into a plurality of zones, means responsive to the presence of a car in a zone for operating its zoning device for that zone, a timer for each zone for indicting the existence of a service demand in that zone, means responsive to operation of a down call device in a zone for starting the timer for that zone, means responsive to the presence of a down car in a zone for preventing operation of the timer for that zone and for restoring it to its normal condition if it is in operation, a reverse service device for each car, means responsive to operation of a timer indicating a service demand in its zone for preparing the reverse service devices for operation, means responsive to the presence of an up moving car in the zone of a timer indicating a service demand for operating the reverse service device of that car, means responsive to operation of the reverse service device of a car when it is in a zone for causing operation of its stopping means at the floor of the highest down call in that zone and for operating its reversing means to change it to a down car in that zone, means responsive to the operation of a car call device of an up-moving car for a floor above it for preventing operation of its reverse service device, and means responsive to one operation of the reverse service device of a car during a trip for preventing another operation thereof during that trip.

13. An elevator system comprising a plurality of cars for serving a plurality of floors, a stopping means for each car, a reversing means for each car, up call devices and down call devices associated with the floors for causing operation of the stopping means of the cars as they approach the floors of operated call devices, car call devices in each car for registering stops to let off passengers, a plurality of zoning devices individual to each car for dividing the floors into a plurality of zones, means responsive to the presence of a car in a zone for operating its zoning device for that zone, a timer for each zone for indicating the existence of a service demand in that zone, means responsive to operation of a down call device in a zone for starting the timer for that zone, means responsive to the presence of a down car in a zone for preventing operation of the timer for that zone and for restoring it to its normal condition if it is in operation, a by-passing device for each car, a reverse service device for each car, means responsive to operation of a timer indicating a service demand in its zone for preparing the reverse service devices for operation, means responsive to the presence of an up moving car in the zone of a timer indicating a service demand for operating the reverse service device of that car, means responsive to operation of the reverse service device of a car when it is in a zone for causing operation of its stopping means at the floor of the highest down call in that zone and for operating its reversing means to change it to a down car in that zone, means responsive to the operation of a car call device of an up-moving car for a floor above it for preventing operation of its reverse service device, and means responsive to one operation of the reverse service device of a car during a trip for preventing another operation thereof during that trip and for preventing operation of the by-passing device of that car during that trip.

14. In an elevator system for operating a plurality of cars serving a plurality of floors, an up stop call device for each floor, a down stop call device for each floor, a stopping means for each car, means responsive to operation of a stop call device at a floor for operating the stopping means of a car approaching in the direction of the operated call device, a plurality of zoning devices for each car and responsive thereto for dividing the floors into a plurality of zones, means responsive to one or more down call devices in a zone remaining in operated condition until a predetermined service demand exists in that zone for causing one of a plurality of down cars above that zone to by-pass the calls ahead of it until it moves into that zone, and means responsive to one by-passing operation of a car during a trip for preventing another by-passing operation of that car during that trip.

15. In an elevator system for operating a plurality of cars serving a plurality of floors, an up stop call device for each floor, a down stop call device for each floor, a stopping means for each car, means responsive to operation of a stop call device at a floor for operating the stopping means of a car approaching in the direction of the operated call device, a plurality of zoning devices for each car and responsive thereto for dividing the floors into a plurality of zones, a timer for each zone, means responsive to one or more down call devices in a zone remaining in operated condition until a predetermined service demand exists in that zone for causing a service demand operation of the timer for that zone, means responsive to the service demand operation of a timer for causing one of a plurality of down cars in the zone above the zone of that timer to by-pass the calls ahead of it until it moves into the zone of the service demand operated timer to answer the service demand therein, and means responsive to a by-passing operation of one car for preventing the simultaneous by-passing operation of another car.

16. In an elevator system for operating a plurality of cars serving a plurality of floors, an up stop call device for each floor, a down stop call device for each floor, a stopping means for each car, means responsive to operation of a stop call device at a floor for operating the stopping means of a car approaching in the direction of the operated call device, a plurality of zoning devices for each car and responsive thereto for dividing the floors into a plurality of zones, a timer for each zone, means resposive to one or more down call devices in a zone remaining in operated condition until a predetermined service demand exists in that zone for causing a service demand operation of the timer for that zone, means responsive to the service demand operation of a timer for causing one of a plurality of down cars in the zone above the zone of that timer to by-pass the calls ahead of it until it moves into the zone of the service demand operated timer to answer the service demand therein, and means responsive to one by-passing operation of a car during a trip for preventing another by-passing operation of that car during that trip.

17. An elevator system comprising a plurality of cars for serving a plurality of floors, a stopping means for each car, up hall call devices and down hall call devices associated with the floors for automatically causing operation of the stopping means of the cars as they approach the floors for which call devices have been operated, a plurality of zoning devices individual to each car for dividing the floors into a plurality of zones, means responsive to the presence of a car in a zone for operating its zoning device for that zone, a timer for each zone for indicating a service demand in that zone, means responsive to operation of a down call device in a zone for starting the timer for that zone, means responsive to operation of a down car in a zone for preventing operation of the timer for that zone and for restoring it to its normal condition if it is in operation, a by-passing device for each car, means operably responsive to a timer indicating a service demand in its zone for preparing the by-passing devices for operation, means responsive to the presence of a plurality of down cars in the zone above the zone of a timer indicating a service demand for operating the by-passing means of one of said plurality of down cars to cause that car to by-pass the hall call devices ahead of it until its moves into the zone of the timer indicating the service demand, and means responsive to one operation of a by-passing device of a car during a trip for preventing another operation thereof during that trip.

18. An elevator system comprising a plurality of cars for serving a plurality of floors, a stopping means for each car, up hall call devices and down hall call devices associated with the floors for causing operation of the stopping means of the first car to approach the floor of an operated call device in the direction of the operated call device, a plurality of zoning devices individual to each car for dividing the floors into a plurality of zones, means responsive to the presence of a car in a zone for operating its zoning device for that zone, a timer for each zone for indicating when one or more down calls in that zone have remained unanswered sufficiently long to constitute a service demand, means responsive to operation of a down call device in a zone for starting the timer for that zone, means responsive to operation of a down car in a zone for preventing operation of the timer for that zone and for restoring it to its normal condition if it is in operation, a by-passing device for each car, means operably responsive to a timer indicating a service demand in its zone for preparing the by-passing devices for operation, means responsive to the presence of a plurality of down cars in the zone above the zone of a timer indicating a service demand for operating the by-passing means of one of said plurality of down cars, means responsive to operation of the by-passing device of a car for preventing operation of the stopping means of that car by an operated hall call registering device until said car enters the zone of the timer indicating a service demand, whereby said car will by-pass calls in the zone in which it is positioned to answer calls in the zone of the timer indicating the service demand, and means responsive to one operation of a by-passing device of a car during a trip for preventing another operation thereof during that trip.

19. An elevator system comprising a plurality of cars for serving a plurality of floors, a stopping means for each car, up hall call devices and down hall call devices associated with the floor for causing operation of the stopping means of the first car to approach the floor of an operated call device in the direction of the operated call device, a plurality of zoning devices individual to each car for dividing the floors into a plurality of zones, means responsive to the presence of a car in a zone for operating its zoning device for that zone, a timer for each zone for indicating when one or more down calls in that zone have remained unanswered sufficiently long to constitute a service demand, means responsive to operation of a down call device in a zone for starting the timer for that zone, means responsive to operation of a down car in a zone for preventing operation of the timer for that zone and for restoring it to its normal condition if it is in operation, a by-passing device for each car, means operably responsive to a timer indicating a service demand in its zone for preparing the by-passing devices for operation, means responsive to the presence of a plurality of down cars in the zone above the zone of a timer indicating a service demand for operating the by-passing means of one of said plurality of down cars, means responsive to operation of the by-passing device of a car for preventing operation of the by-passing devices of the other cars, and means responsive to operation of the by-passing device of a car for preventing operation of the stopping means of that car by an operated hall call registering device until said car enters the zone of the timer indicating a service demand, whereby said car will by-pass calls in the zone in which it is positioned to answer calls in the zone of the timer indicating the service demand.

20. An elevator system comprising a plurality of cars for serving a plurality of floors, a stopping means for each car, up hall call devices and down hall call devices associated with the floors for causing operation of the stopping means of the first car to approach the floor of an operated call device in the direction of the operated call device, a plurality of zoning devices individual to each car for dividing the floors into a plurality of zones, means responsive to the presence of a car in a zone for operating its zoning device for that zone, a timer for each zone for indicating when one or more down calls in that zone have remained unanswered sufficiently long to constitute a service demand, means responsive to operation of a down call device in a zone for starting the timer for that zone, means responsive to operation of a down car in a zone for preventing operation of the timer for that zone and for restoring it to its normal condition if it is in operation, a by-passing device for each car, means operably responsive to a timer indicating a service demand in its zone for preparing the by-passing devices for operation, means responsive to the presence of a plurality of down cars in the zone above the zone of a timer indicating a service demand for operating the by-passing means of one of said plurality of down cars, means responsive to operation of the by-passing device of a car for preventing operation of the by-passing devices of the other cars, means responsive to operation of the by-passing device of a car for preventing operation of the stopping means of that car by an operated hall call device until said car enters the zone of the timer indicating a service demand, whereby said car will by-pass calls in the zone in which it is positioned to answer calls in the zone of the timer indicating the service demand, and means responsive to one operation of a by-passing device of a car during a trip for preventing another operation thereof during that trip.

WILLIAM F. EAMES.

REFERENCES CITED

The following references are of record in the file of this patent:

UNITED STATES PATENTS

| Number | Name | Date |
|---|---|---|
| 2,291,271 | Williams et al. | July 28, 1942 |